(12) United States Patent
Abe

(10) Patent No.: US 9,948,143 B2
(45) Date of Patent: Apr. 17, 2018

(54) CONTACTLESS POWER-SUPPLY SYSTEM, CONTACTLESS ADAPTER, AND POWER-SUPPLY DEVICE

(71) Applicant: Panasonic Intellectual Property Management Co., Ltd., Osaka (JP)

(72) Inventor: Hideaki Abe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 579 days.

(21) Appl. No.: 14/422,326

(22) PCT Filed: Mar. 13, 2013

(86) PCT No.: PCT/JP2013/001651
§ 371 (c)(1),
(2) Date: Feb. 18, 2015

(87) PCT Pub. No.: WO2014/038107
PCT Pub. Date: Mar. 13, 2014

(65) Prior Publication Data
US 2015/0244175 A1    Aug. 27, 2015

(30) Foreign Application Priority Data

Sep. 6, 2012   (JP) ................................. 2012-196384

(51) Int. Cl.
*H02J 5/00*     (2016.01)
*H02J 50/12*    (2016.01)
(Continued)

(52) U.S. Cl.
CPC ............ *H02J 50/12* (2016.02); *G06F 1/1635* (2013.01); *G06F 1/26* (2013.01); *H01F 38/14* (2013.01);
(Continued)

(58) Field of Classification Search
USPC ........................................................ 307/104
See application file for complete search history.

(56) References Cited

U.S. PATENT DOCUMENTS 5,821,731 A * 10/1998 Kuki ................... B60L 11/1805
320/108
6,239,577 B1 * 5/2001 Koike ..................... H02J 7/025
320/108
(Continued)

FOREIGN PATENT DOCUMENTS

JP      2000-341887 A     12/2000
JP      2007-257013 A     10/2007
(Continued)

OTHER PUBLICATIONS

Taiwanese Office Action for corresponding Taiwanese Application No. 102109861 dated Feb. 5, 2015.
(Continued)

*Primary Examiner* — Rexford Barnie
*Assistant Examiner* — Xuan Ly
(74) *Attorney, Agent, or Firm* — Renner, Otto, Boisselle & Sklar, LLP

(57) ABSTRACT

A contactless adapter (30) installed in a notebook computer (20) has a plug part (31), a telescopic arm (34), a power circuit part (35), and a power-receiving part (40). The power-receiving part (40) is provided with a secondary coil (41) and has a rotatably linked fixed base plate (42) and a rotating base plate (43). Power can be supplied without contact to the notebook computer (20) from a power-supply device (10) via the contactless adapter (30) by expanding the fixed base plate (42) and the rotating base plate (43) to cause the secondary coil (41) to face the primary coil (11) of the power-supply device (10) provided inside the tabletop (2) of a desk (1).

14 Claims, 24 Drawing Sheets

(51) Int. Cl.
- H02J 50/90 (2016.01)
- H02J 7/02 (2016.01)
- H02J 50/70 (2016.01)
- H02J 50/40 (2016.01)
- G06F 1/26 (2006.01)
- H01F 38/14 (2006.01)
- H02J 7/00 (2006.01)
- G06F 1/16 (2006.01)
- H04B 5/00 (2006.01)

(52) U.S. Cl.
CPC ............... *H02J 5/00* (2013.01); *H02J 5/005* (2013.01); *H02J 7/0042* (2013.01); *H02J 7/02* (2013.01); *H02J 7/025* (2013.01); *H02J 50/40* (2016.02); *H02J 50/70* (2016.02); *H02J 50/90* (2016.02); *H04B 5/0037* (2013.01); *H04B 5/0093* (2013.01)

(56) References Cited

U.S. PATENT DOCUMENTS

| | | |
|---|---|---|
| 2003/0080906 A1 | 5/2003 | Miyasaka |
| 2004/0195767 A1 | 10/2004 | Randall |
| 2007/0182367 A1 | 8/2007 | Partovi |
| 2007/0194526 A1 | 8/2007 | Randall |
| 2007/0279002 A1 | 12/2007 | Partovi |
| 2008/0246215 A1 | 10/2008 | Randall |
| 2009/0072782 A1 | 3/2009 | Randall |
| 2009/0096413 A1 | 4/2009 | Partovi et al. |
| 2009/0098750 A1 | 4/2009 | Randall |
| 2009/0127937 A1 | 5/2009 | Widmer et al. |
| 2010/0070219 A1 | 3/2010 | Azancot et al. |
| 2010/0072825 A1 | 3/2010 | Azancot et al. |
| 2010/0073177 A1 | 3/2010 | Azancot et al. |
| 2010/0181841 A1 | 7/2010 | Azancot et al. |
| 2010/0194336 A1 | 8/2010 | Azancot et al. |
| 2010/0253282 A1 | 10/2010 | Azancot et al. |
| 2010/0257382 A1 | 10/2010 | Azancot et al. |
| 2011/0018360 A1* | 1/2011 | Baarman ............... H02J 5/005 307/104 |
| 2011/0050164 A1 | 3/2011 | Partovi et al. |
| 2011/0148041 A1 | 6/2011 | Randall |
| 2011/0221385 A1 | 9/2011 | Partovi et al. |
| 2012/0032522 A1 | 2/2012 | Schatz et al. |
| 2012/0038619 A1 | 2/2012 | Azancot et al. |
| 2012/0071091 A1 | 3/2012 | Azancot et al. |
| 2012/0080958 A1 | 4/2012 | Randall |
| 2012/0126745 A1 | 5/2012 | Partovi et al. |
| 2012/0230521 A1 | 9/2012 | Azancot et al. |
| 2012/0256585 A1 | 10/2012 | Partovi et al. |
| 2013/0175877 A1 | 7/2013 | Abe et al. |

FOREIGN PATENT DOCUMENTS

| | | |
|---|---|---|
| JP | 2010-098867 A | 4/2010 |
| JP | 2010-517502 A | 5/2010 |
| JP | 2010-520741 A | 6/2010 |
| JP | 2010-527226 A | 8/2010 |
| JP | 2010-263690 A | 11/2010 |
| JP | 2011-504354 A | 2/2011 |
| JP | 2011-508578 A | 3/2011 |
| JP | 2011-083407 A | 4/2011 |
| JP | 2011-151900 A | 8/2011 |
| JP | 2011-182593 A | 9/2011 |
| TW | I221949 B | 10/2004 |
| TW | 201236303 A | 9/2012 |
| WO | WO 2011/011681 A2 | 1/2011 |

OTHER PUBLICATIONS

International Preliminary Report on Patentability for corresponding International Patent Application No. PCT/JP2013/001651 (English translation), dated Mar. 10, 2015.

Extended European Search Report for corresponding European Patent Application No. 13835895.7 dated Sep. 23, 2015.

International Search Report for corresponding International Application No. PCT/JP2013/001651 dated Jun. 18, 2013.

* cited by examiner

CONTACTLESS POWER-SUPPLY SYSTEM, CONTACTLESS ADAPTER, AND POWER-SUPPLY DEVICE

TECHNICAL FIELD

The present invention relates to a contactless power supply system, a contactless adapter, and a power supplying device.

BACKGROUND ART

In recent years, a contactless power supply that supplies power to an electrical appliance with high efficiency has become practical. Patent document 1 describes an example of a contactless power supplying device including a primary coil embedded in a flat surface of a table. An electrical appliance incorporating a secondary coil is arranged above the primary coil so that the contactless power supplying device supplies power to the electrical appliance.

PRIOR ART DOCUMENTS

Patent Document

Patent Document 1: Japanese Laid-Open Patent Publication No. 2011-151900

SUMMARY OF THE INVENTION

Situations greatly differ when using an electrical appliance such as a notebook computer, a tablet PC, or the like that requires a high output power supply of several watts to several tens of watts or greater on a desk. The inventors of the present invention reviewed contactless power supply systems of several referential examples. A contactless power supply system of a first referential example includes a power supplying device and a notebook computer. The power supplying device includes a primary coil embedded in a corner of a desktop of a desk, for example, at one or a plurality of areas extending toward the rear. The notebook computer includes a secondary coil installed at the bottom of the computer. In the first referential example, power is not supplied to the notebook computer unless the notebook computer is placed immediately above a compact primary coil embedded in the corner of the desk. Thus, when using the notebook computer, the operator is forced to be in the same unnatural posture for a long period of time. This is not practical.

In a contactless power supply system of a second referential example, a primary coil of a power supplying device is arranged at a central position of a desk. Since the position where the notebook computer can be comfortably used differs among individuals, the operator may be forced to be in the same unnatural posture for a long period of time in the second referential example as well. For example, when documents are laid out next to the notebook computer, the notebook computer cannot be moved. Thus, the operator will be forced to continue the same unnatural posture for a long period of time. This is not practical. Further, mobile equipment such as a notebook computer requires being compact. However, to receive power from a primary coil, a secondary coil needs to have an increased coil area and needs to be thicker. This imposes restrictions to miniaturization.

A contactless power supply system of a third referential example includes a contactless adapter incorporating a secondary coil that is connected to an electrical appliance, such as a personal computer or the like, by a power supplying cable. In the third referential example, a short power supplying cable is used to wire-connect the contactless adapter and the electrical appliance. Although the cable is an obstacle, the position of the electrical appliance can be changed in the vicinity of a limited power supplying space. Thus, the personal computer can be used while being charged. However, in order to supply a high output of several watts several tens of watts or greater to the electrical appliance, a secondary coil needs to have a wide area exceeding a diameter of five cm. This enlarges the contactless adapter. The large contactless adapter always needs to be carried together with the notebook computer. This adversely affects the usability of the compact notebook computer. Further, the contactless adapter needs to be connected whenever the notebook computer is used.

The inventors of the present invention have conducted research on electrical appliances, such as personal computers that can be supplied with a high output while performing tasks, and found a technique that keeps electrical appliances compact and easy to carry and store, while maintaining the convenience of wireless power supplying that allows high output to be supplied just by simply placing the electrical appliance, and the inventors have completed the invention of the present application.

It is an object of the present invention to provide a contactless power supply system that can increase the degree of freedom for arrangement of an electrical appliance and enable the supply of a high output while ensuring compactness and portability of the electrical appliance.

EMBODIMENTS OF THE INVENTION

A contactless power supply system according to a first embodiment of the present invention will now be described.

Figure 1:
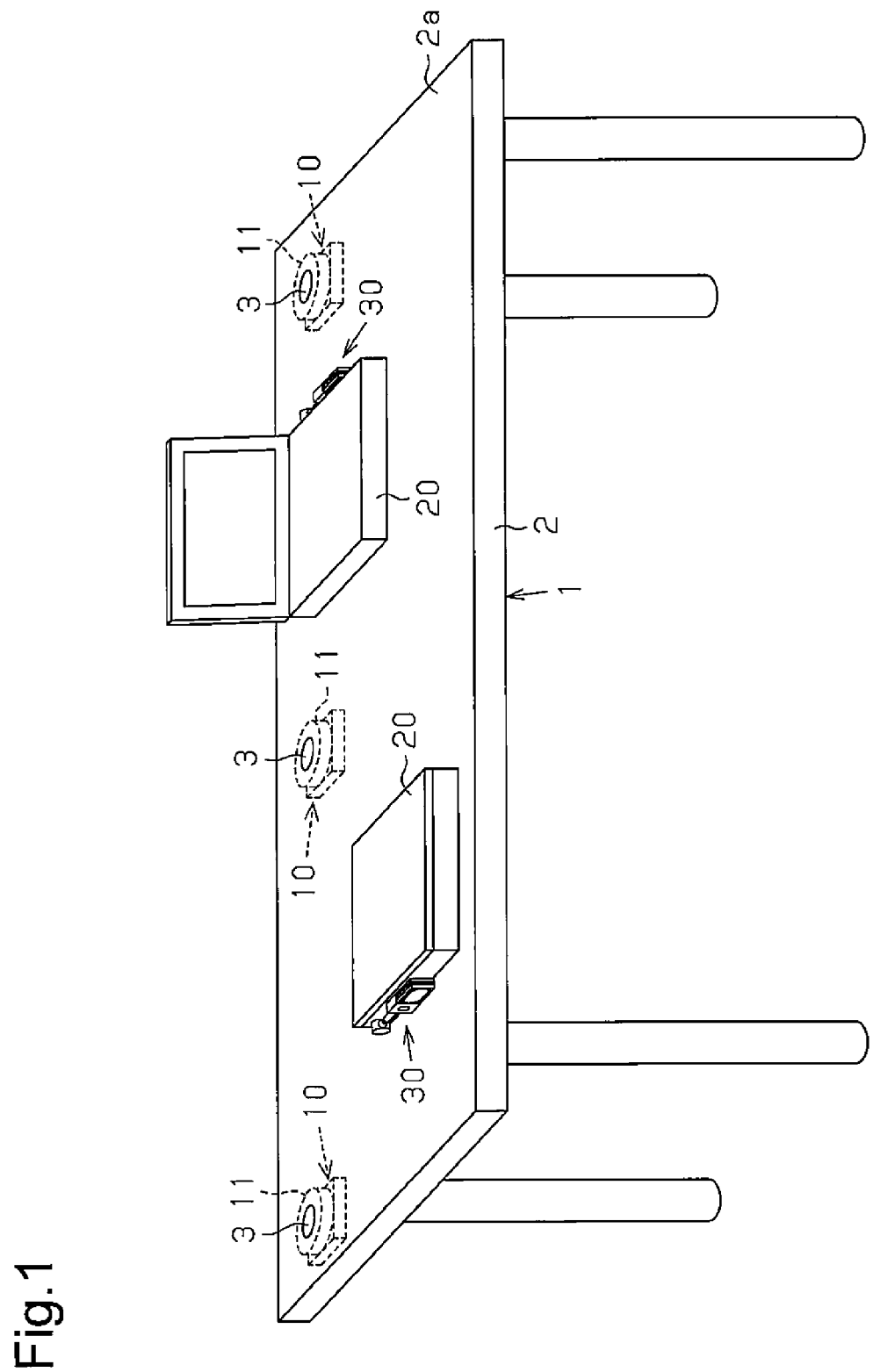
FIG. 1 is a perspective view of a contactless power supply system.

The contactless power supply system includes a power supplying device 10, a contactless adapter 30, and an electrical appliance such as a notebook computer 20. The contactless adapter 30 is electrically connected or magnetically coupled to the electrical appliance to supply power, in a contactless manner, from the power supplying device 10 to the electrical appliance such as the notebook computer 20. FIG. 1 shows the power supplying device 10 fixed or accommodated in three rearward areas in a desktop 2 of a desk 1, namely, left, right, and central positions. A primary coil 11 and a high frequency inverter 12, which generates a high frequency current and sends the high frequency current to the primary coil 11, are arranged in a housing of each power supplying device 10. The primary coil 11 is arranged on an upper side of the housing of the power supplying device 10, and a coil surface of the primary coil 11 is arranged parallel to a surface 2a of the desktop 2.

Figure 2:
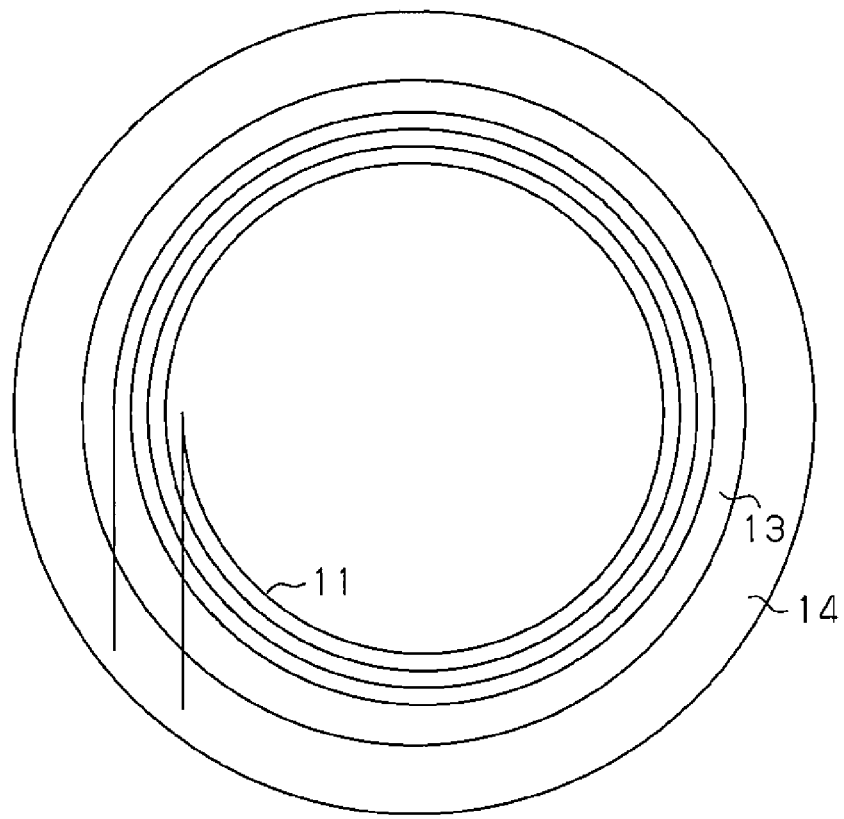
FIG. 2 is a plan view of a primary coil, a magnetic body, and an electromagnetic shield plate of a power supplying device.
Figure 3:
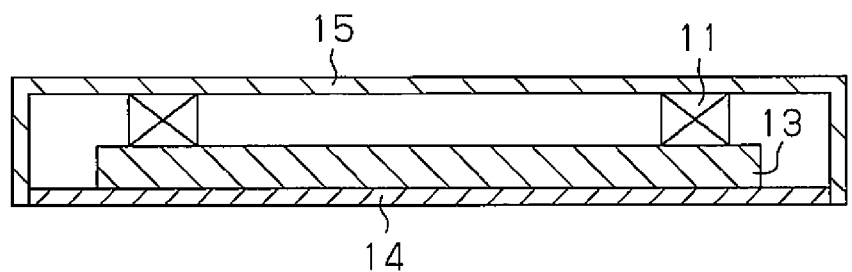
FIG. 3 is a cross-sectional view of the primary coil, the magnetic body, and the electromagnetic shield plate of the power supplying device.

As shown in FIGS. 2 and 3, a magnetic body 13, which is formed by a silicon steel plate, ferrite core, or the like, is arranged on a lower side of the coil surface of the primary coil 11. An electromagnetic shield plate 14 made of aluminum, copper, or the like is fixed to the lower side of the magnetic body 13. The primary coil 11, the magnetic body 13, and the electromagnetic shield plate 14 are accommodated in a cover case 15.

Figure 4A:
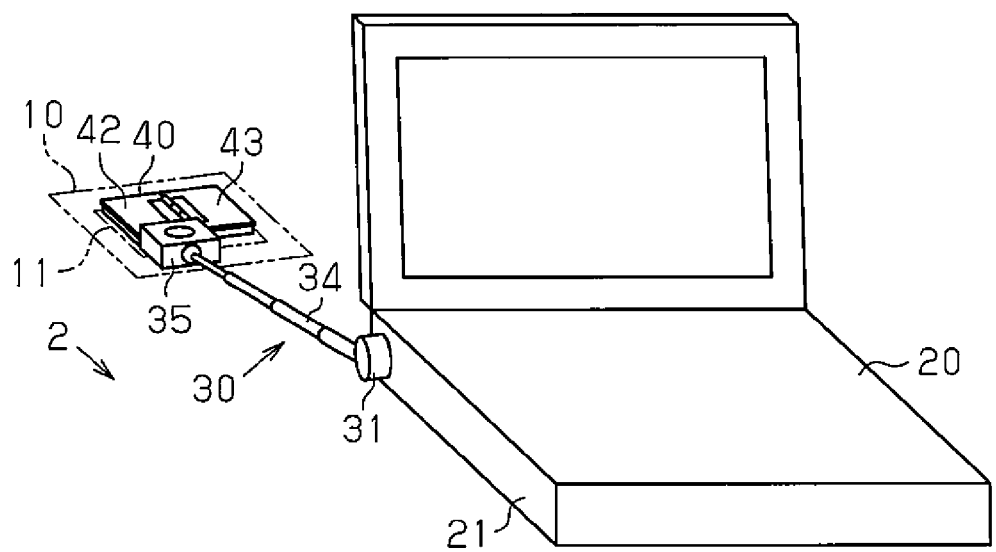
FIG. 4A is a perspective view of a notebook computer, a contactless adapter, and the power supplying device.

A marker 3 indicating the center of each primary coil 11 is indicated on the surface 2a of the desktop 2. The notebook computer 20 serving as the electrical appliance is mounted on the desktop 2. The contactless adapter 30 is attached in a removable manner to a main body side surface 21 of the notebook computer 20. As shown in FIG. 4A, drive power is supplied from the power supplying device 10 to the notebook computer 20 via the contactless adapter 30.

Figure 4B:
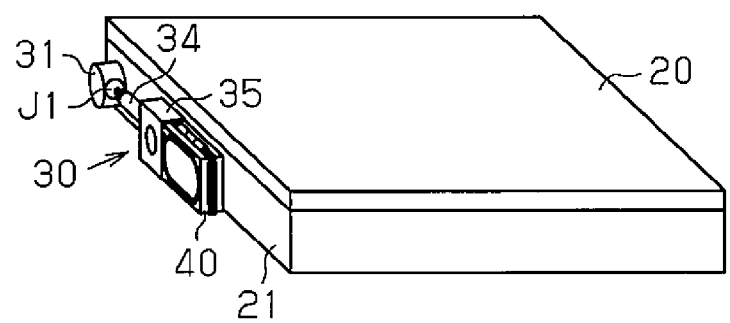
FIG. 4B is a perspective view of the contactless adapter, in a contracted state, and the notebook computer.
Figure 5:
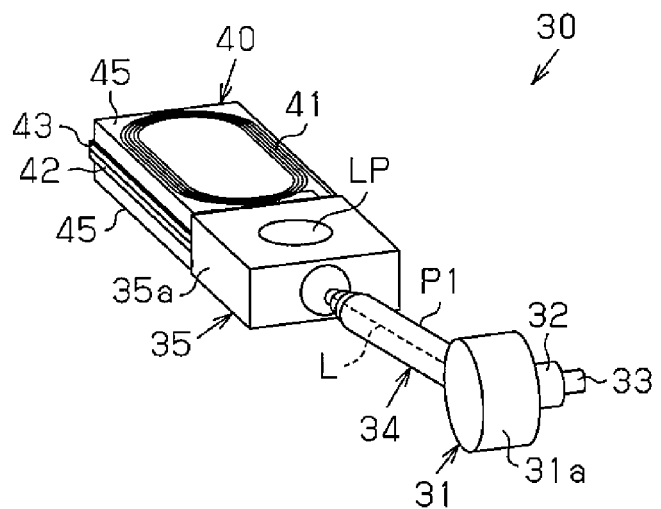
FIG. 5 is a perspective view showing the contactless adapter in a contracted state.
Figure 6:
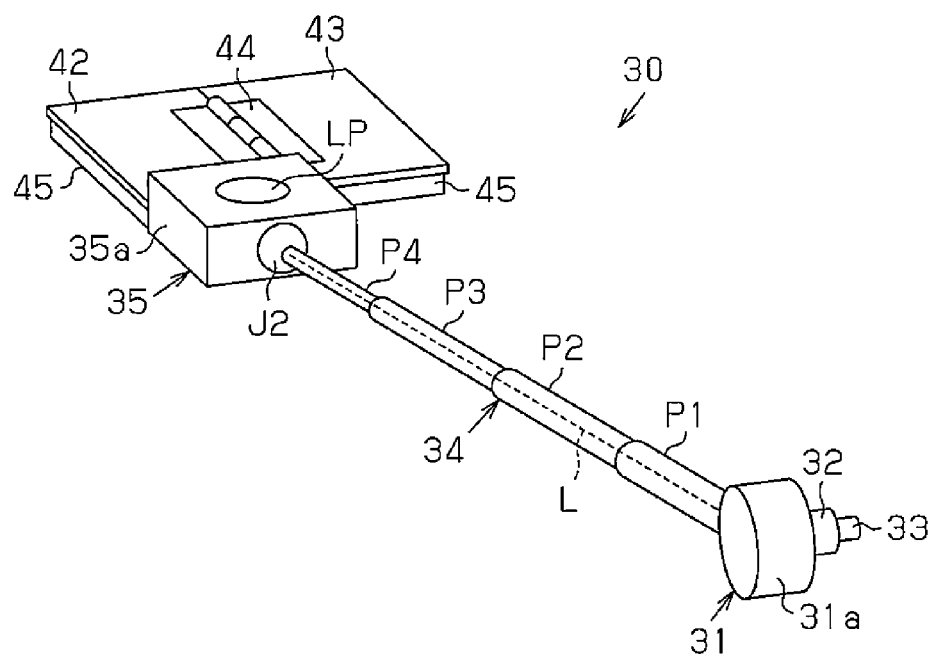
FIG. 6 is a perspective view showing the contactless adapter in an extended state.

As shown in FIGS. 4 to 6, the contactless adapter 30 includes a plug unit 31 attached in a removable manner to a plug socket (not shown) provided on the main body side surface 21 of the notebook computer 20. The plug unit 31 includes an output terminal 33 that projects from a shaft portion 32 of a tubular housing 31a, for example. When the shaft portion 32 is attached to the plug socket of the notebook computer 20, the output terminal 33 is electrically connected to a power supply input terminal of the notebook computer 20. When the shaft portion 32 is attached to the plug socket of the notebook computer 20, the housing 31a of the plug unit 31 is rotationally supported about the shaft portion 32 with respect to the notebook computer 20. As shown in FIGS. 5 and 6, the plug unit 31 (housing 31a) is coupled to a power supply circuit unit 35 by a telescopic arm 34.

The sliding resistance when pivoting the shaft portion 32 with respect to the plug socket of the notebook computer 20 is set to a sliding resistance in which the plug unit 31 (contactless adapter 30) does not pivot with respect to the notebook computer 20 and such state is held unless a certain extent of force is applied. Thus, unless a force is applied in a desired direction at any pivoting position, the plug unit 31 (contactless adapter 30) is held at the pivoting position.

The telescopic arm 34 includes a plurality of (four in the first embodiment) pipes P1 to P4 and first and second universal joints J1, J2. The widest pipe P1 is coupled to the plug unit 31 (housing 31a) by the first universal joint J1 (see FIG. 4B). The narrowest pipe P4 is coupled to a housing 35a of the power supply circuit unit 35 by the second universal joint J2.

The sliding resistances between the pipes P1 to P4 are set so that the pipes are not extended nor contracted and held is the same state unless a certain extent of force is applied. In the same manner, the sliding resistance between the pipe P1 and the first universal joint J1 is set such that the pipe P1 does not swing about the first universal joint J1 and is held in the same state unless a certain extent of force is applied. A sliding resistance between the second universal joint J2 and a distal end portion of the pipe P4 is set so that the housing 35a does not swing about the second universal joint J2 and is held in the same state unless a certain extent of force is applied. Therefore, the power supply circuit unit 35 can be extended in the desired direction and held in the same state by simply extending or contracting the pipes P1 to P4 and applying a force to the power supply circuit unit 35 in the desired direction. The housing 31a of the plug unit 31 can be rotated with respect to the notebook computer 20 with the telescopic arm 34 radially extended from the housing 31a. The telescopic arm 34 serves as an example of a coupling body. Each pipe of the telescopic arm 34 is a rigid body pipe in a preferred example, but can be a flexible pipe that can be curved in another preferred example.

An insulation coated connection line L that connects the output terminal of the power supply circuit unit 35 and the output terminal 33 of the plug unit 31 is wired in the telescopic arm 34. In the preferred example, a reel is arranged in the housing 31a of the plug unit 31. The reel reels the connection line L wired in the pipes P1 to P4 into the housing 31a of the plug unit 31 when the telescopic arm 34 is contracted. Further, the connection line L is reeled out from the housing 31a of the plug unit 31 when the telescopic arm 34 is extended.

The housing 35a of the power supply circuit unit 35 is, for example, box-shaped. The second universal joint J2 of the telescopic arm 34 is coupled to one side surface of the housing 35a. The housing 35a of the power supply circuit unit 35 is coupled to a power receiving unit 40 including a secondary coil 41 at a side surface opposite to the surface coupled to the telescopic arm 34. Therefore, the power supply circuit unit 35 (housing 35a) and the power receiving unit 40 are coupled to the plug unit 31 by the telescopic arm 34 and can be extended in the desired direction with respect to the plug unit 31 (notebook computer 20).

Figure 12:
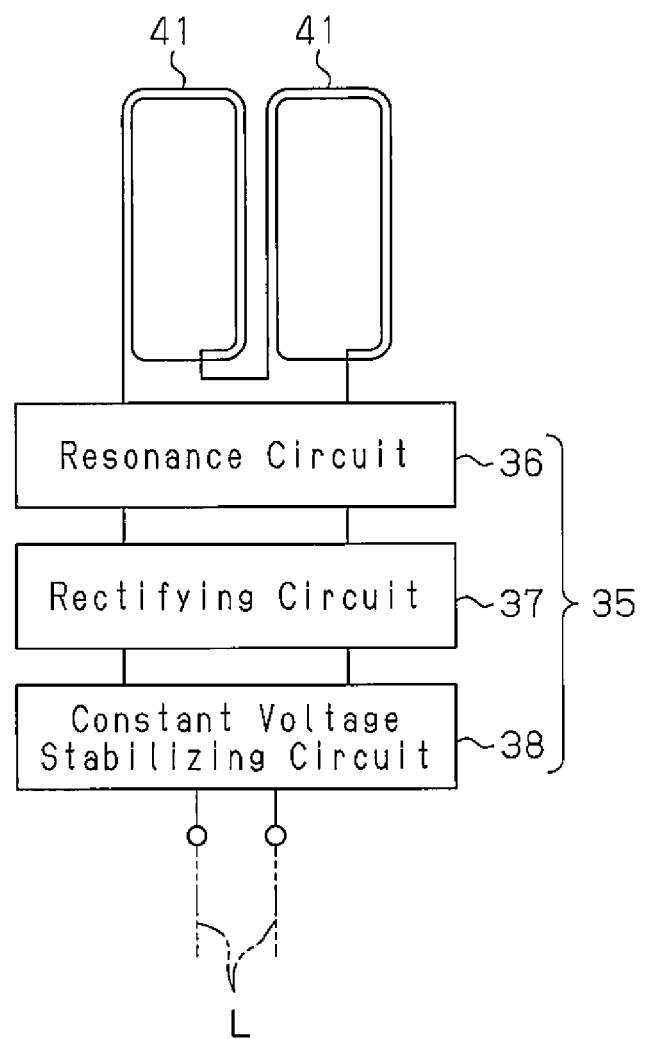
FIG. 12 is an electrical block circuit diagram of a power supply circuit unit of the contactless adapter.

A circuit substrate including various types of elements that form a resonance circuit 36, a rectifying circuit 37, and a constant voltage stabilizing circuit 38 shown in FIG. 12 is incorporated in the housing 35a of the power supply circuit unit 35. The resonance circuit 36, the rectifying circuit 37, and the constant voltage stabilizing circuit 38 in the power supply circuit unit 35 convert an induced electromotive force generated at the secondary coil 41 of the power receiving unit 40 to a desired direct current (DC) voltage and supplies the converted output voltage to the output terminal 33 of the plug unit 31 via the connection line L.

In the illustrated example, a display lamp LP is arranged on an outer side surface of the housing 35a of the power supply circuit unit 35. The display lamp LP displays a magnetically coupled state of the secondary coil 41 of the power receiving unit 40 and the primary coil 11 of the power supplying device 10. For example, the lamp LP is illuminated with a brightness corresponding to the coupled state. In the first embodiment, the brightness of the display lamp LP changes according to the value of the DC voltage rectified by the rectifying circuit 37 shown in FIG. 12. When the display lamp LP is the brightest, this means that the magnetically coupled state of the secondary coil 41 of the power receiving unit 40 and the primary coil 11 of the power supplying device 10 is in the best state. When the display lamp LP is not illuminated, this means that the secondary coil 41 and the primary coil 11 are not magnetically coupled or high frequency current is not supplied to the primary coil 11.

To control the indication of the display lamp LP, secondary current I2 (see FIG. 14) flowing to the secondary coil 41 may be detected, and the indication of the display lamp LP may be controlled based on the current value. A magnetic sensor such as a Hall element or the like may be arranged in the power receiving unit 40, and the indication of the display lamp LP may be controlled based on the detection result of the magnetic sensor.

Figure 7:
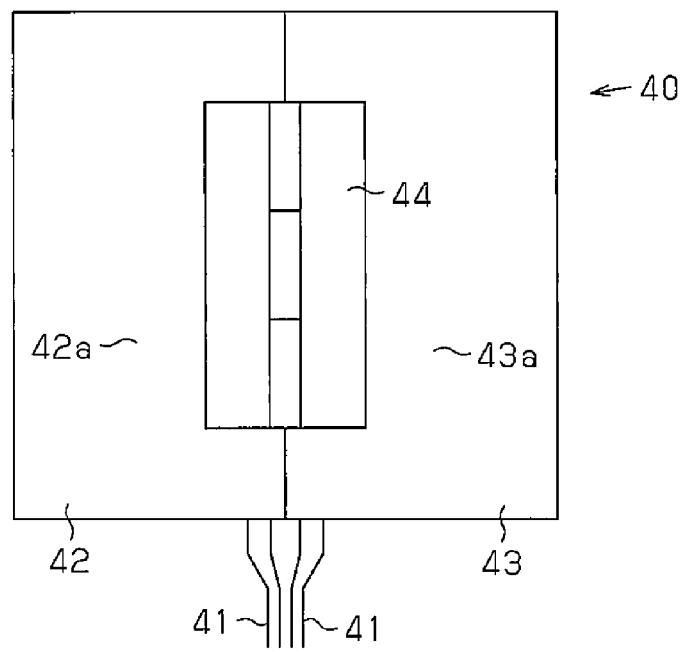
FIG. 7 is a front view of a non-power receiving surface of a power receiving unit in a spread state.

As shown in FIGS. 5 and 6, the power receiving unit 40 includes a fixed substrate 42 and a pivot substrate 43. The fixed substrate 42 is a rectangular plate made from a material having an electromagnetic shield property such as aluminum, copper, or the like. One short side surface of the fixed substrate 42 is coupled to a side surface of the power supply circuit unit 35 (housing 35a). The pivot substrate 43 is made from the same material and has the same shape as the fixed substrate 42. As shown in FIGS. 6 and 7, the pivot substrate 43 is coupled to the fixed substrate 42 by a hinge 44. In this example, the pivot substrate 43 pivots between two positions, a folded position (FIG. 5) where the pivot substrate 43 overlaps the fixed substrate 42 and a spread position (FIG. 6) where the pivot substrate 43 is arranged side by side with the fixed substrate 42. The hinge 44 is arranged on the long side, for example, of the fixed substrate 42 and the pivot substrate 43.

In the preferred example, the sliding resistance of when the hinge 44 pivots is set to the sliding resistance at which the pivot substrate 43 does not pivot with respect to the fixed substrate 42 and is held in the same state unless a certain extent of force is applied. Thus, the pivot substrate 43 is held at the same pivoting position unless force is applied in the desired direction at any pivoting position between the two positions, the folded position and the spread position.

In the fixed substrate 42 and the pivot substrate 43, surfaces that face each other when folded are referred to as non-power receiving surfaces 42a, 43a and surfaces that do not face each other are referred to as power receiving surfaces 42b, 43b.

Figure 8:
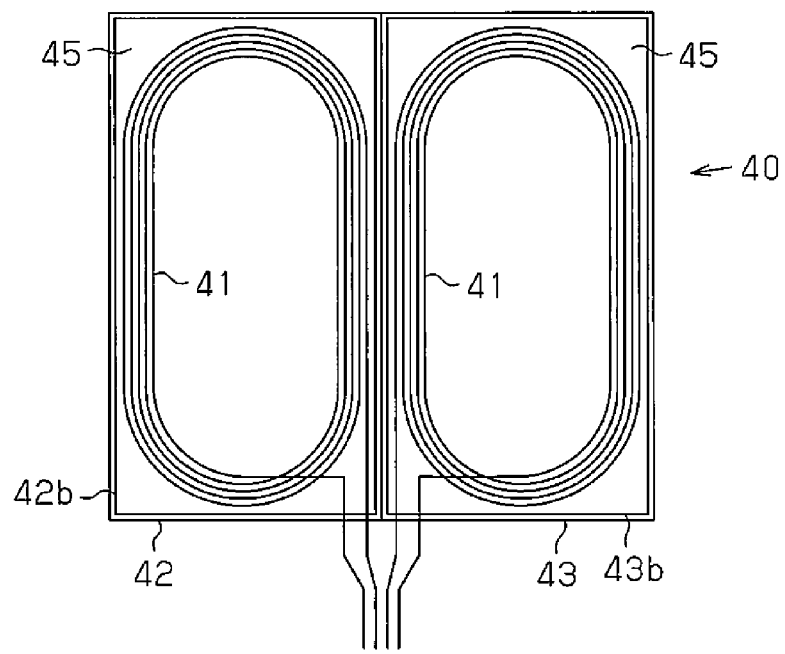
FIG. 8 is a front view of a power receiving surface of the power receiving unit in the spread state.
Figure 9:
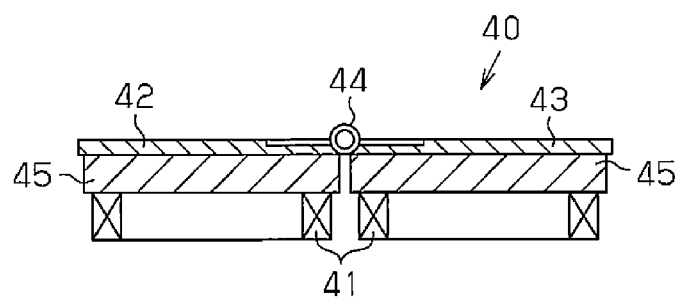
FIG. 9 is a cross-sectional view of the power receiving unit in the spread state.
Figure 10:
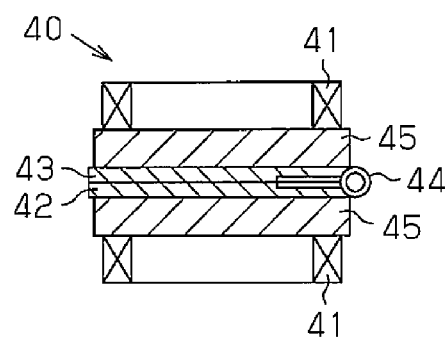
FIG. 10 is a cross-sectional view of the power receiving unit in a folded state.

As shown in FIGS. 8 to 10, magnetic bodies 45 having the same shape and formed from silicon steel plates, ferrite cores, or the like are attached to the power receiving surfaces 42b, 43b of the fixed substrate 42 and the pivot substrate 43. Secondary coils 41 having the same shape and the same number of windings are each attached to the surface of one of the magnetic bodies 45. The magnetic bodies 45 and the secondary coils 41 attached to the power receiving surfaces 42b, 43b of the fixed substrate 42 and the pivot substrate 43 are covered with a protective film (not shown) made of synthetic resin. The surface of the protective film is formed to become the power receiving surfaces 42b, 43b of the pivot substrate 43.

When the pivot substrate 43 is at the spread position, the protective film of the fixed substrate 42 (coil surface of the secondary coil 41) and the protective film of the pivot substrate 43 (coil surface of the secondary coil 41) are flush with each other. The fixed substrate 42 and the pivot substrate 43 serve as an example of a substrate segment.

A starting end and a terminating end of the secondary coil 41 arranged on the fixed substrate 42 and the pivot substrate 43 are guided into the housing 35a of the power supply circuit unit 35. The secondary coils 41 of the fixed substrate 42 and the pivot substrate 43 are connected in series.

Figure 11:
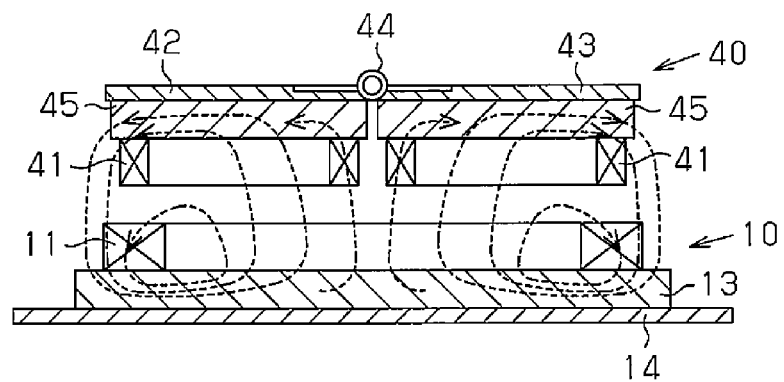
FIG. 11 is a schematic cross-sectional view of the magnetically coupled power supplying device and the contactless adapter.

With the pivot substrate 43 in the spread position, the center position of the surface formed by arranging the fixed substrate 42 and the pivot substrate 43 side by side as shown in FIG. 8 is aligned with the marker 3 indicated on the surface of the desktop 2. As shown in FIG. 11, the magnetic flux of the primary coil 11 interlinks with the secondary coil 41, that is, the primary coil 11 and the secondary coil 41 are in the magnetically coupled state. The secondary coils 41 of the fixed substrate 42 and the pivot substrate 43 are supplied with the high frequency current to interlink with the alternating magnetic field generated from the primary coil 11 to generate the induced electromotive force.

Therefore, as shown in FIG. 1, when the notebook computer 20 is placed on the desk 1, the power supply circuit unit 35 and the power receiving unit 40 of the contactless adapter 30 attached to the notebook computer 20 are extended to the position of any marker 3 indicated on the desktop 2. Then, as shown in FIG. 4, the pivot substrate 43 of the power receiving unit 40 is spread out, and the center position when spread is aligned with the marker 3. Thus, the induced electromotive force generated by the power receiving unit 40 is input as a drive power to the notebook computer 20 through the power supply circuit unit 35. Therefore, the notebook computer 20 can receive power from the power supplying device 10 by using the contactless adapter 30 even if spaced apart from the power supplying device 10.

An electrical configuration of the contactless power supply system will now be described according to FIG. 13.

Figure 13:
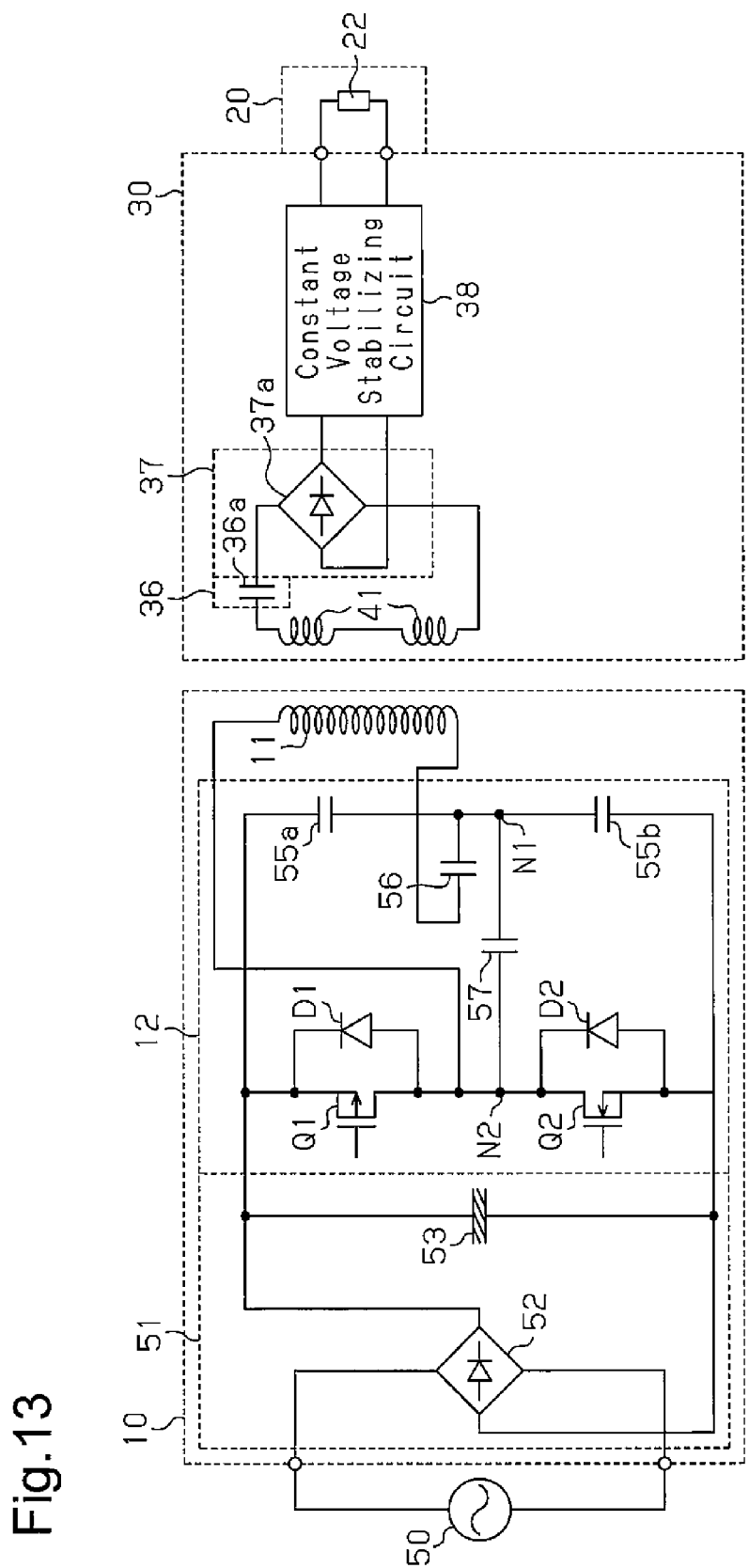
FIG. 13 is an electrical circuit diagram of the contactless power supply system.

As shown in FIG. 13, the power supplying device 10, which is connected to a commercial alternating current (AC) power supply 50, includes a power supply circuit 51, which converts AC voltage to DC power, and the high frequency inverter 12, which generates a high frequency current flowing through the primary coil 11 based on the DC power from the power supply circuit 51.

The power supply circuit 51 includes a rectifying circuit 52 and a smoothing capacitor 53. The rectifying circuit 52, which is connected to a power supply such as the commercial AC power supply 50, full-wave-rectifies the AC voltage, converts AC voltage to DC voltage, and outputs the DC voltage to the smoothing capacitor 53. The smoothing capacitor 53 smoothens the waveform of the DC voltage rectified by the rectifying circuit 52 and applies the DC voltage to the high frequency inverter 12 as DC power.

The high frequency inverter 12 is a half bridge type partial resonance circuit, and includes a voltage dividing circuit, in which a first capacitor 55a and a second capacitor 55b are connected in series between the terminals of the smoothing capacitor 53.

A drive circuit, which is a series circuit in which a first power transistor Q1 and a second power transistor Q2 are connected in series, is connected in parallel to the voltage dividing circuit. The first power transistor Q1 and the second power transistor Q2 are MOSFETs in the first embodiment, with flywheel diodes D1, D2 are connected between the source and the drain.

A series circuit of the primary coil 11 and a resonance series capacitor is connected between a connecting point (node N1) of the first capacitor 55a and the second capacitor 55b and a connecting point (node N2) of the first power transistor Q1 and the second power transistor Q2.

A resonance parallel capacitor 57 is connected in parallel with respect to the series circuit of the primary coil 11 and the series capacitor 56.

A drive signal is provided to each gate terminal of the first power transistor Q1 and the second power transistor Q2 from an excitation synchronization signal generation circuit (not shown). The drive signal provided to each gate terminal of the first and second power transistors Q1, Q2 is a complementary signal. Thus, the first power transistor Q1 and the second power transistor Q2 are alternately activated and deactivated in a complementary manner. High frequency current thus flows to the primary coil 11. The primary coil 11 generates the alternating magnetic field with the high frequency current.

The high frequency inverter 12 is a half bridge type in the first embodiment, but may be a full bridge type in another example.

The contactless adapter 30 includes the secondary coil 41, the resonance circuit 36, the rectifying circuit 37, and the constant voltage stabilizing circuit 38. The secondary coil 41 is arranged in the power receiving unit 40. The resonance circuit 36, the rectifying circuit 37, and the constant voltage stabilizing circuit 38 are arranged in the power supply circuit unit 35.

The secondary coil 41 of the fixed substrate 42 and the secondary coil 41 of the pivot substrate 43 are connected in series. In this case, the secondary coils 41 are connected in series to add the induced electromotive force generated at the secondary coil 41 of the fixed substrate 42 and the induced electromotive force generated at the secondary coil 41 of the pivot substrate 43 that are based on the alternating magnetic field from the primary coil 11. The series circuit of the two secondary coils 41 is connected in series with a resonance capacitor 36a of the resonance circuit 36, and the induced electromotive force in which the induced electromotive forces of the two secondary coils 41 are added is output to the rectifying circuit 37 via the resonance circuit 36.

The rectifying circuit 37 is a full-wave rectifying circuit 37a including a diode bridge circuit. The full-wave rectifying circuit 37a full-wave-rectifies the induced electromotive force supplied through the resonance circuit 36 and outputs the rectified DC voltage to the constant voltage stabilizing circuit 38.

The constant voltage stabilizing circuit 38 converts the DC voltage from the full-wave rectifying circuit 37a to a rated DC voltage for driving the notebook computer 20, and supplies the converted voltage to a load 22 of the notebook computer 20 through the connection line L and the output terminal 33. The notebook computer 20 can thus be used with the power supplied from the power supplying device 10.

Figure 14A:
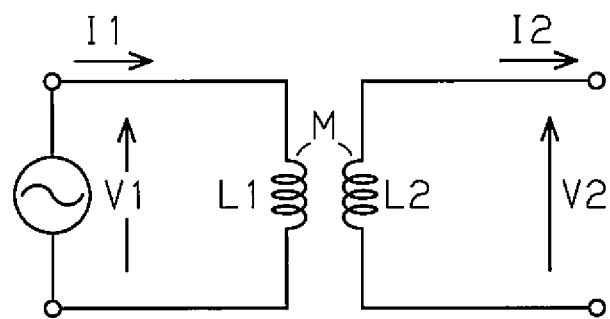
FIG. 14A is an equivalent circuit diagram of the magnetically coupled primary coil and the secondary coil.

A circuit representing the electromagnetic induction by the magnetic coupling of the primary coil 11 and the secondary coil 41 is extracted from the electrical circuit of FIG. 13 and shown in FIG. 14A.

In FIG. 14A, input voltage between the terminals of the primary coil 11 is represented by V1 and a primary current flowing to the primary coil 11 is represented by I1. Furthermore, when an output voltage between the terminals of the secondary coil 41 is V2, and a secondary current flowing to the secondary coil 41 is I2, equations (1), (2), and (3) are satisfied.

Here, L1 is self-inductance of the primary coil 11, L2 is self-inductance of the secondary coil 41, M is mutual inductance, and K is a coupling coefficient.

$$V1 = L1 \cdot \frac{dI1}{dt} - M \cdot \frac{dI2}{dt}$$ [Equation 1]

$$V2 = -L2 \cdot \frac{dI2}{dt} + M \cdot \frac{dI1}{dt}$$ [Equation 2]

$$K = \frac{M}{\sqrt{L1 \cdot L2}}$$ [Equation 3]

Using equations (1) and (3), equation (2) can be transformed to equation (4). Equation (4) can be further transformed to equation (5).

$$V2 = K \cdot \sqrt{\frac{L2}{L1}} \cdot V1 - L2(1-K^2)\frac{dI2}{dt}$$ [Equation 4]

$$V2 = E2 - L02 \cdot \frac{dI2}{dt}$$ [Equation 5]

$$\left( E2 = K \cdot \sqrt{\frac{L2}{L1}} \cdot V1 \quad L02 = L2(1-K^2) \right)$$

A first term of equation (5) indicates a secondary inductive voltage (induced electromotive force) E2 when the input side is viewed from the output side (secondary coil 41). A second term of equation (5) indicates a secondary conversion equivalent leakage inductance L02 connected in series with the secondary inductive voltage (induced electromotive force) E2 when the input side is viewed from the output side (secondary coil 41).

Figure 14B:
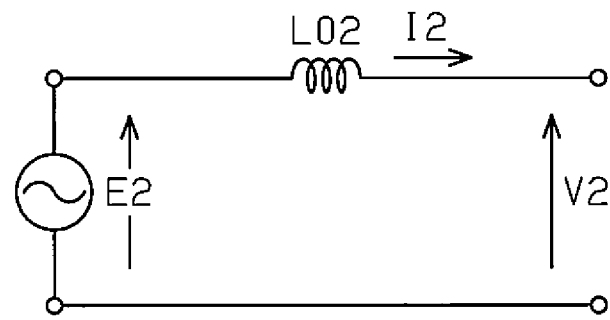
FIG. 14B is an equivalent circuit diagram in which the circuit diagram of FIG. 14A is converted to the secondary side.

According to equation (5), the circuit of FIG. 14A can be represented as a secondary side converted simple equivalent circuit shown in FIG. 14B.

If the input voltage V1 between the terminals of the primary coil 11 can be controlled to be constant, the secondary inductive voltage (induced electromotive force) E2 also becomes constant. The equivalent leakage inductance L02 is alternating impedance on a line, where it is apparent that voltage drop occurs due to the flowing secondary current I2.

In this case, on the output terminal side of the secondary coil 41, power is supplied to the load 22 through the resonance circuit 36, the rectifying circuit 37, and the constant voltage stabilizing circuit 38. However, the relationship of the input voltage V1, the output voltage V2, and the secondary current I2 follows equation (4) regardless of the type of circuit and load connected to the output side of the secondary coil 41.

For example, when holding the input voltage V1 as a high frequency voltage having a constant amplitude of a sine wave or a square wave, if the relative position of the secondary coil 41 is changed with respect to the primary coil 11, the output voltage V2 causes the secondary inductive voltage (induced electromotive force) E2 and the equivalent leakage inductance L02 to change due to the change in the coupling coefficient K indicating the extent of the magnetic coupling degree of the primary coil 11 and the secondary coil 41. The secondary current I2 flows due to the secondary coil output side circuit and the load. The secondary current I2 causes a voltage drop in the equivalent leakage inductance L02.

In the first embodiment, when the positional relationship of the secondary coil 41 changes depending on each situation with respect to the primary coil 11. Thus, the value of the output voltage V2 differs when there is a load and when there is no load. This changes the supply voltage to the load (L1 and L2 also slightly change).

Therefore, in the first embodiment, even if the power receiving voltage or the power receivable power is changed, the secondary coil 41 needs to be used by facing the primary coil 11 within a range that entirely covers the range from no load (standby) to the maximum load of the notebook computer 20.

The operation of the contactless power supply system will now be described.

As shown in FIG. 1, the notebook computer 20 is placed on the desk 1 (desktop 2) spaced apart from the power supplying device 10. The contactless adapter 30 is attached to the main body side surface 21 of the notebook computer 20. As shown in FIG. 1, the housing 31a of the plug unit 31 of the contactless adapter 30, the contracted telescopic arm 34, the housing 35a of the power supply circuit unit 35, and the power receiving unit 40 in which the fixed substrate 42 and the pivot substrate 43 are in the folded state are arranged along the main body side surface 21 of the notebook computer 20.

From this state, the housing 31a of the plug unit 31 is rotated with respect to the notebook computer 20 to direct the telescopic arm 34, the housing 35a of the power supply circuit unit 35, and the power receiving unit 40 toward the power supplying device 10 (marker 3 indicated on the desktop 2) located at the rear in order to receive power from the power supplying device 10 at the separated location.

The telescopic arm 34 is extended so that the housing 35a of the power supply circuit unit 35 and the power receiving unit 40 reach the vicinity of the marker 3. In this case, the first universal joint J1 that couples the basal end of the telescopic arm 34 (pipe P1) and the housing 31a of the plug unit 31 enables the angle between the telescopic arm 34 and the notebook computer 20 to be changed within a plane along the desktop 2. In the preferred example, the housing 35a of the power supply circuit unit 35 and the power receiving unit 40 can be drawn out in a target direction, for example, toward the position indicated by the marker 3 by slightly moving the notebook computer 20 or having no need to move the notebook computer 20 at all. After the housing 35a of the power supply circuit unit 35 and the power receiving unit 40 are drawn to an approximate position, the pivot substrate 43 is pivoted with respect to the fixed substrate 42 to have the power receiving unit 40 in the spread state.

As shown in FIG. 4, the center position of the fixed substrate 42 and the pivot substrate 43 in the spread state is aligned with the marker 3 indicated on the desktop 2. Preferably, the power receiving unit 40 is aligned so that the display lamp LP becomes the brightest. The telescopic arm 34 (pipes P1 to P4 and first and second universal joints J1, J2) that allows fine tuning enables accurate alignment of the power receiving unit 40. In the preferred example, the secondary coil 41 of the power receiving unit 40 can be adjusted to the optimum magnetically coupled state with respect to the primary coil 11 by slightly moving the notebook computer 20 or having no need to move the notebook computer 20 at all.

The secondary coils 41 of the fixed substrate 42 and the pivot substrate 43 of the power receiving unit 40 interlink with the alternating magnetic field generated at the primary coil 11 of the power supplying device 10 and generate induced electromotive force. The power supply circuit unit 35 converts the induced electromotive force to a predetermined DC voltage and supplies the DC voltage from the output terminal 33 of the plug unit 31 to the notebook computer 20 as drive power through the connection line L wired in the telescopic arm 34. Thus, the notebook computer 20 is driven when receiving the DC power from the contactless adapter 30. The plug unit 31 including the output terminal 33 serves as an example of an output unit.

The first embodiment has the following advantages.

(1) In the first embodiment, the notebook computer 20 receives power from the power supplying device 10 with the contactless adapter 30 attached to the notebook computer 20 even if the notebook computer 20 is spaced apart from the power supplying device 10. This increases the degree of freedom for the position where the notebook computer 20 may be placed on the desk 1.

(2) In the first embodiment, the power receiving unit 40 includes the secondary coil 41 in each of the fixed substrate 42 and the pivot substrate 43. The hinge 44 couples the fixed substrate 42 and the pivot substrate 43 so pivoting can be performed between the folded position and the spread position. When the pivot substrate 43 is spread to the spread position with respect to the fixed substrate 42, the secondary coil 41 of the fixed substrate 42 is flush with the secondary coil 41 of the pivot substrate 43. This enlarges the area of the coil surface of the secondary coils 41 of the power receiving unit 40 facing the coil surface of the primary coil 11, that is, the area of the coil surface configured by the secondary coil 41 of the fixed substrate 42 and the secondary coil 41 of the pivot substrate 43.

Therefore, induced electromotive force of a high output is obtained from the alternating magnetic field of the primary coil 11 of the power supplying device 10.

(3) In the first embodiment, the marker 3 indicating the arrangement position of the primary coil 11 accommodated in the desktop 2 is indicated on the desktop 2 of the desk 1. Therefore, alignment can be performed with the center of the primary coil 11 of the power supplying device 10 by simply aligning the center positions of the fixed substrate 42 and the pivot substrate 43 in the spread position with the marker 3 so that power is supplied with high efficiency.

Furthermore, the highly accurate magnetic coupling of the secondary coils 41 with respect to the primary coil 11 is easy to visually recognize due to the illumination of the display lamp LP in the housing 35a of the power supply circuit unit 35. Thus, power can be supplied with high efficiency.

(4) In the first embodiment, the pivot substrate 43 is folded to the folded position with respect to the fixed substrate 42 so that the secondary coil 41 of the fixed substrate 42 is overlapped with the secondary coil 41 of the pivot substrate 43. This reduces the area of the coil surface of the secondary coils 41 of the power receiving unit 40 as a whole. Thus, the overall size of the power receiving unit 40 becomes compact when not in use.

(5) In the first embodiment, the contactless adapter 30 is attached to the main body side surface 21 of the notebook computer 20. The housing 31a of the plug unit 31 of the contactless adapter 30, the contracted telescopic arm 34, the housing 35a of the power supply circuit unit 35, and the power receiving unit 40, in which the fixed substrate 42 and the pivot substrate 43 are in the folded state, are arranged along the main body side surface 21 of the notebook computer 20. Therefore, the contactless adapter 30 is compact when attached to the notebook computer 20, and the notebook computer 20 may be carried with the contactless adapter 30 attached thereto without the portability being adversely affected.

(6) In the first embodiment, the magnetic body 13 is arranged on the lower side of the coil surface of the primary coil 11. This reduces magnetic flux that leaks to open space. Furthermore, the electromagnetic shield plate 14 is fixed to the lower side of the magnetic body 13. This blocks electromagnetic waves radiated toward the outer side.

(7) In the first embodiment, the magnetic body 45 is arranged on the power receiving surfaces 42b, 43b of the fixed substrate 42 and the pivot substrate 43, and the secondary coil 41 is arranged on each surface of the magnetic body 45. This reduces magnetic flux that leaks to open space. Furthermore, the fixed substrate 42 and the pivot substrate 43 have electromagnetic shielding properties and block electromagnetic waves radiated toward the outer side.

(8) In the first embodiment, the hinge 44 that couples the fixed substrate 42 and the pivot substrate 43 is set to have a sliding resistance so that the pivot substrate 43 is not pivoted with respect to the fixed substrate 42 and held in the same state unless a certain extent of force is applied.

Therefore, the angle of the coil surface of the secondary coil 41 can be adjusted relative to the coil surface of the primary coil 11 of the power supplying device 10, and the relative angle at which power can be received most effectively is always ensured.

The first embodiment may be modified as described below.

In the first embodiment, a measuring function for displaying the magnetically coupled state of the primary coil 11 and the secondary coil 41 with the display lamp LP is provided. However, the measuring function may be omitted.

Figure 15:
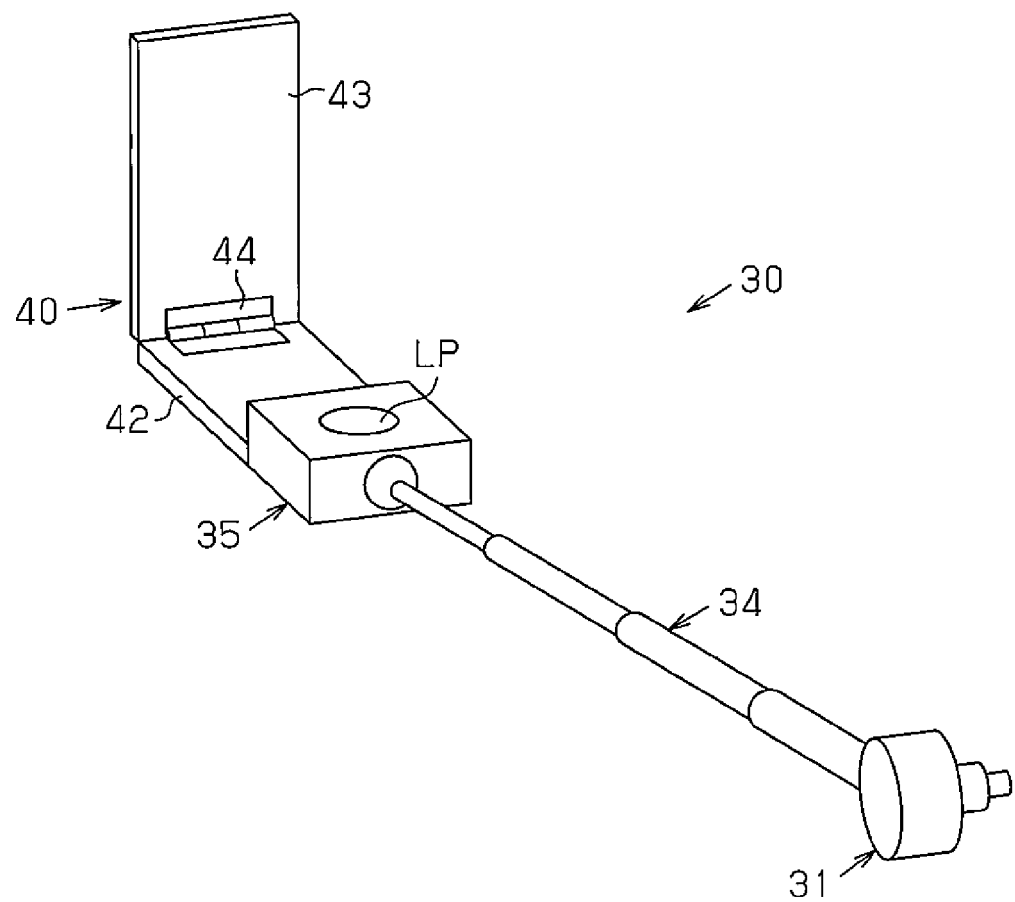
FIG. 15 is a perspective view of a contactless adapter in a first modified example.

In the first embodiment, the power receiving unit 40 couples, with the hinge 44, the right side of the fixed substrate 42 and the left side of the pivot substrate 43 that include the secondary coils 41. As shown in FIG. 15, the pivot substrate 43 may be coupled in a foldable manner to a front end of the fixed substrate 42 by the hinge 44.

Figure 16A:
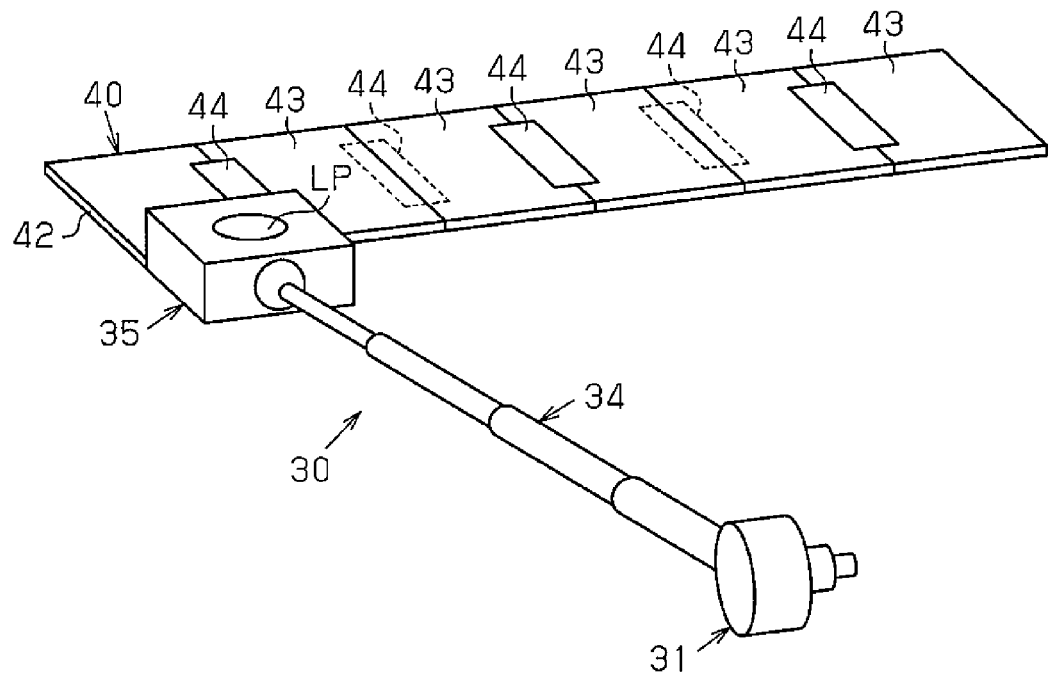
FIGS. 16A and 16B are perspective views of a contactless adapter in a second modified example.
Figure 16B:
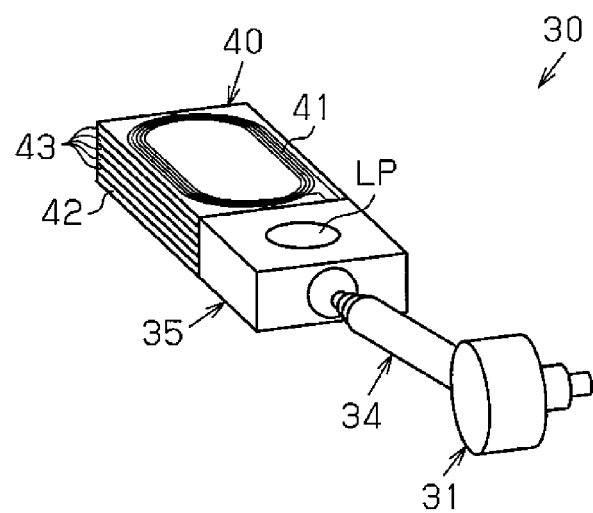

In the first embodiment, the hinge 44 couples the fixed substrate 42 and the pivot substrate 43 that include the secondary coils 41 so that the power receiving unit 40 can be folded in half. As shown in FIG. 16A, five pivot substrates 43 may be coupled horizontally in line to the fixed substrate 42. The adjacent fixed substrate 42 and each pivot substrate 43 may be coupled with the hinge 44 so that the pivot substrates 43 are folded in a zigzagged manner. This allows the power receiving unit 40 to be compact, as shown in FIG. 16B. The hinge 44, for example, may be made of cloth.

In FIG. 16, five pivot substrates 43 are used. Instead, three, four, six or more pivot substrates 43 may be used.

The pivot substrate 43 may be spread out in a plurality of different directions with respect to the fixed substrate 42. For example, in the example shown in FIG. 17A, the pivot substrate 43 includes left and right pivot substrates 43 respectively coupled in a foldable manner to the left and right sides of the fixed substrate 42, a front end pivot substrate 43 coupled in a foldable manner to the front end side of the fixed substrate 42, and right and left front end pivot substrates 43 respectively coupled in a foldable manner to the right and left sides of the front end pivot substrate 43.

Figure 17A:
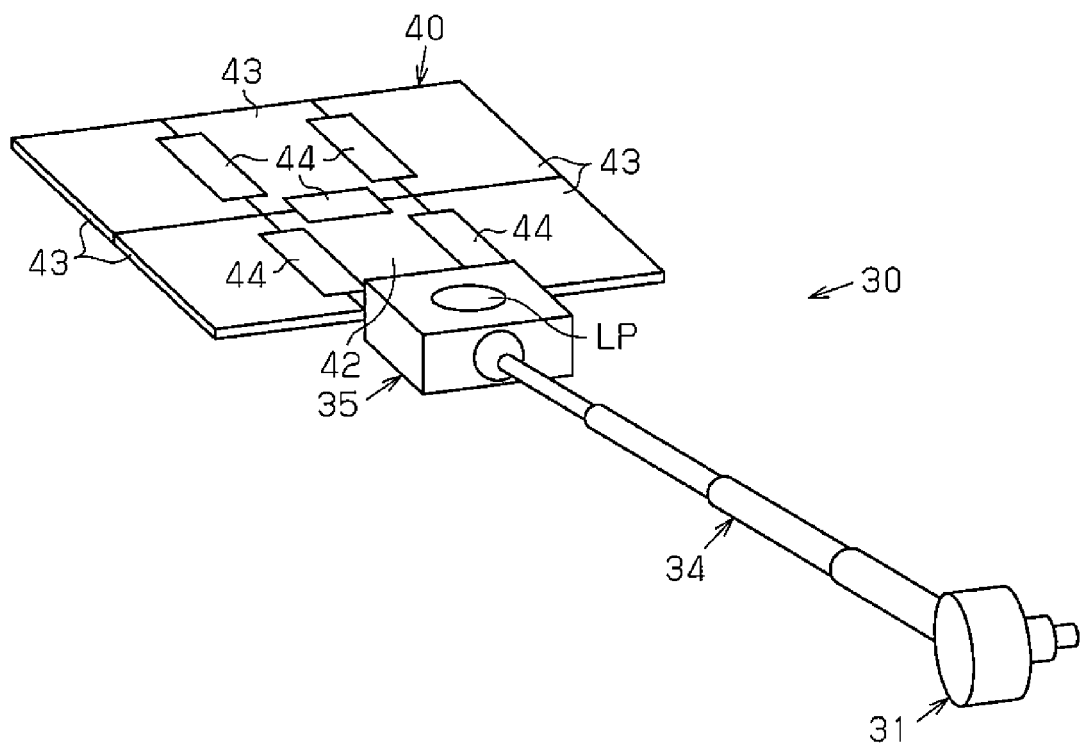
FIGS. 17A and 17B are perspective views of a contactless adapter in a third modified example.
Figure 17B:
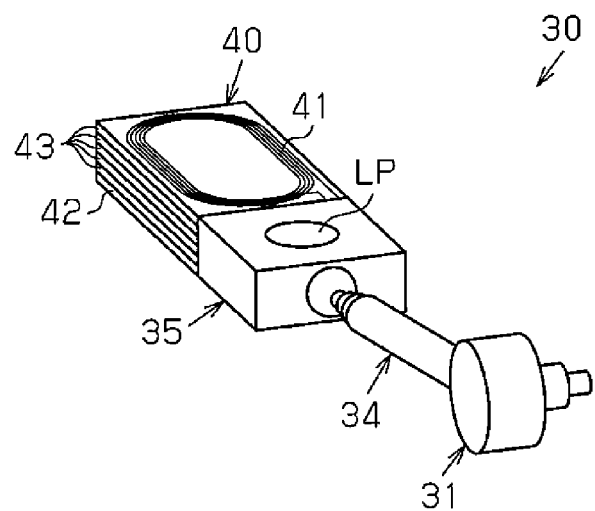

Thus, the left and right pivot substrates 43 are first folded to overlap the fixed substrate 42 in FIG. 17A. Then, the front end right and left front end pivot substrates 43 are folded to overlap the front end pivot substrate 43. The front end pivot substrate 43 is then folded to overlap the fixed substrate 42. This allows the power receiving unit 40 to be compact, as shown in FIG. 17B.

In the first embodiment, the fixed substrate 42 and the pivot substrate 43 are rectangular but do not have to be so.

Figure 18A:
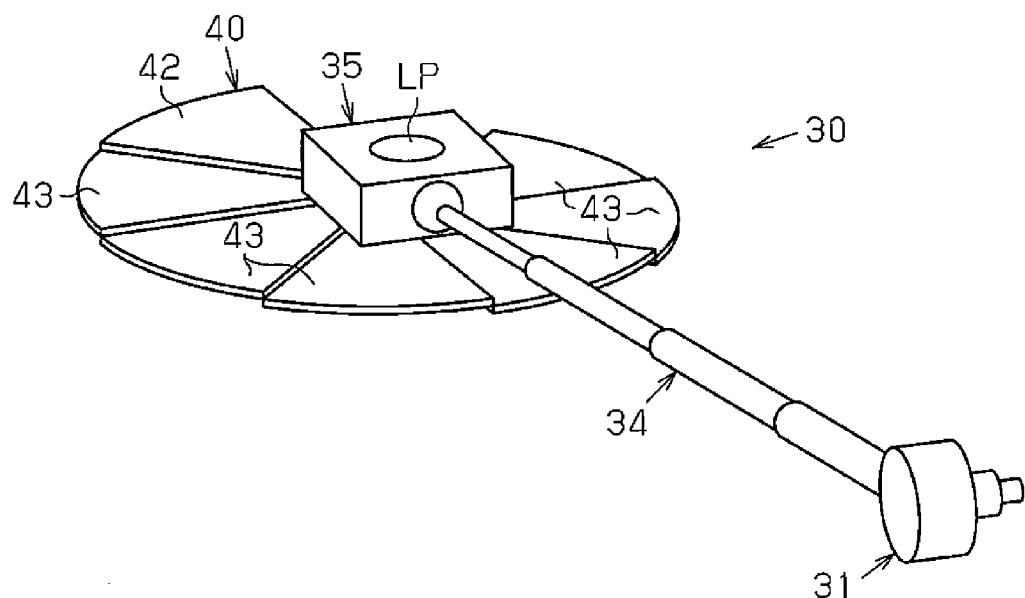
FIGS. 18A and 18B are perspective views of a contactless adapter in a fourth modified example.
Figure 18B:
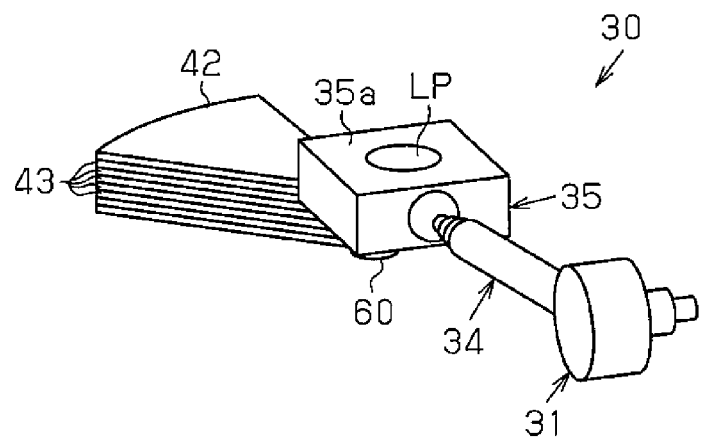

For example, the fixed substrate 42 and the pivot substrate 43 may be sectoral. As shown in FIGS. 18A and 18B, seven pivot substrates 43 having the same shape are overlapped and supported by a supporting shaft 60 on a single sectoral fixed substrate 42.

In detail, the basal end portions of the seven pivot substrates 43 are fixed to the supporting shaft 60 on the single fixed substrate 42 so that the basal end portions are supported to be rotatable about the supporting shaft 60, as shown in FIG. 18B. The single fixed substrate 42 and the seven pivot substrates 43 include a mechanism that engages a lower substrate when the substrates are overlapped with one another to restrict further pivoting in the clockwise direction. Each of the seven pivot substrates 43 include a drawing mechanism that engages upper one of the pivot substrate 43 when pivoted by 45 degrees in the counterclockwise direction and draws together the upper pivot substrate in the same direction.

Thus, when the lowermost pivot substrate 43 is pivoted by 360 degrees in the counterclockwise direction from the folded state shown in FIG. 18B, the six pivot substrates 43 are drawn out and moved in order from the bottom whenever a pivot substrate is pivoted by 45 degrees. This forms the circular power receiving unit 40 that is spread out by 360 degrees as shown in FIG. 18A.

In FIG. 18, a total of eight substrates including the fixed substrates 42 and the pivot substrates 43 are used. Needless to say, the number may be changed.

Figure 19A:
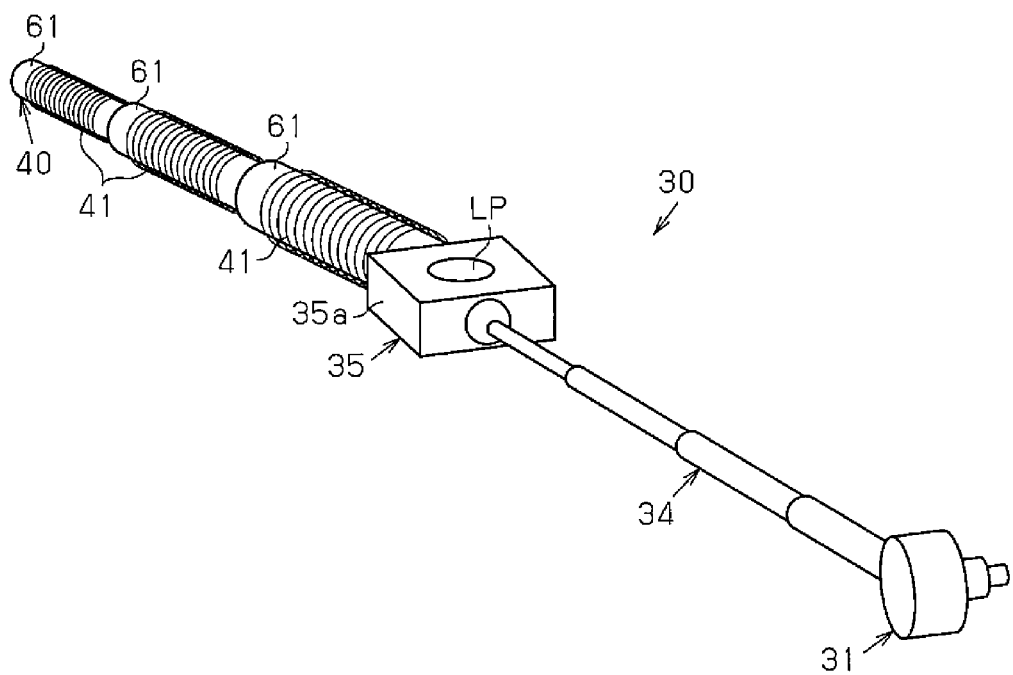
FIGS. 19A and 19B are perspective views of a contactless adapter in a fifth modified example.

In the first embodiment, the fixed substrate 42 and the pivot substrate 43 are planar but do not have to be so. For example, as shown in FIG. 19A, the power receiving unit 40 may include three tubular substrates 61, with the secondary coil 41 is wound around the outer circumference of each tubular substrate 61. The three tubular substrates 61 have different diameters, and the widest tubular substrate 61 is fixed to the power supply circuit unit 35. The second widest tubular substrate 61 is arranged in the widest tubular substrate 61, and the narrowest tubular substrate 61 is incorporated in the second widest tubular substrate 61. The power receiving unit 40 thus has an extensible structure. Preferably, each tubular substrate 61 has a cylindrical shape.

Figure 19B:
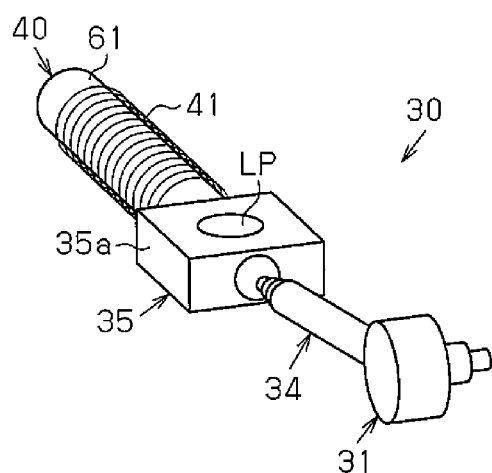

When in use, the second widest tubular substrate 61 and the narrowest tubular substrate 61 are extended to the spread state. When not in use, the narrowest tubular substrate 61 is arranged in the second widest tubular substrate 61, and the second widest tubular substrate 61 is arranged in the widest tubular substrate 61 so that the power receiving unit 40 is compact, as shown in FIG. 19B. Each tubular substrate 61 is another example of a substrate segment.

Figure 20A:
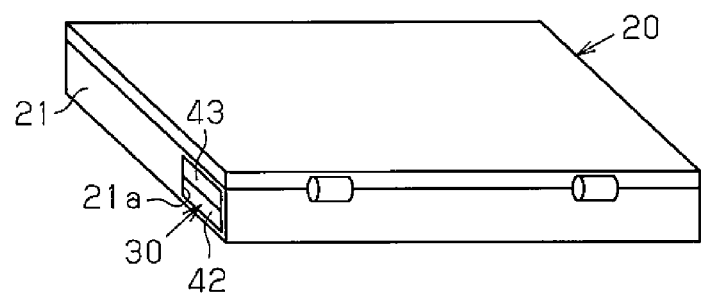
FIGS. 20A and 20B are perspective views of a contactless adapter in a sixth modified example.
Figure 20B:
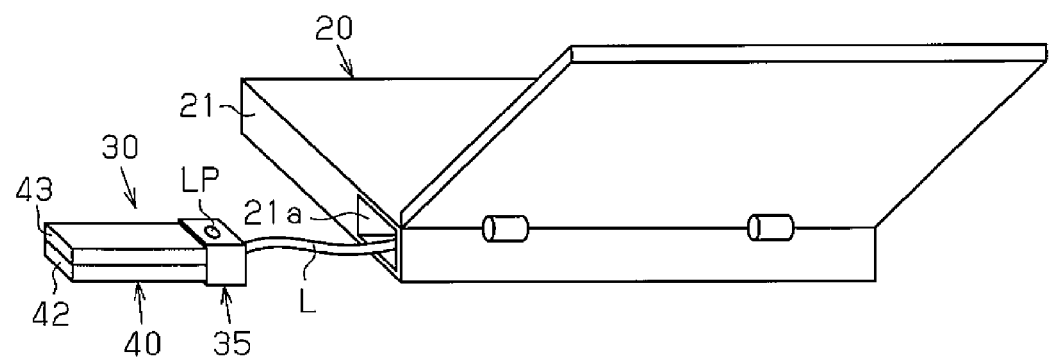

In the first embodiment, the contactless adapter 30 is attached to the main body side surface 21 of the notebook computer 20. In the example shown in FIGS. 20A and 20B, an accommodation compartment 21*a* is provided in the main body side surface 21 of the notebook computer 20. The contactless adapter 30 is accommodated in the accommodation compartment 21*a* when not in use as shown in FIG. 20A. The contactless adapter 30 is pulled out from the accommodation compartment 21*a* when used as shown in FIG. 20B.

In this case, the power supply circuit unit 35 and the power receiving unit 40 may have the same configuration as the first embodiment, and the telescopic arm 34 is omitted. The insulation coated connection line L is pulled out from the power supply circuit unit 35, and the distal end of the connection line L that is pulled out is connected to a power supply input terminal of the notebook computer 20 arranged in the main body of the notebook computer 20 as an output terminal.

A cord reel is arranged in the accommodation compartment 21*a*. When the power supply circuit unit 35 and the power receiving unit 40 are accommodated in the accommodation compartment 21*a*, the insulation coated connection line L is reeled into the accommodation compartment 21*a* by the cord reel.

When drawing the power supply circuit unit 35 and the power receiving unit 40 out of the accommodation compartment 21*a*, the insulation coated connection line L is reeled out from the accommodation compartment 21*a* by the cord reel, and pulled out together with the power supply circuit unit 35 and the power receiving unit 40. In this case, when the connection line L is no longer pulled, the cord reel holds the connection line L in the same state even if tension is released. In such a state, the contactless adapter 30 can be supplied with power from the power supplying device 10 at a position spaced apart from the notebook computer 20.

When stopping the supply of power, tension is applied to the connection line L and then immediately released so that the cord reel reels in the connection line L. This accommodates the connection line L in the accommodation compartment 21*a* together with the power supply circuit unit 35 and the power receiving unit 40.

Therefore, when not in use, the contactless adapter 30 is completely accommodated in accommodation compartment 21*a*, as shown in FIG. 20A. This further improves the portability of the notebook computer 20.

Figure 21A:
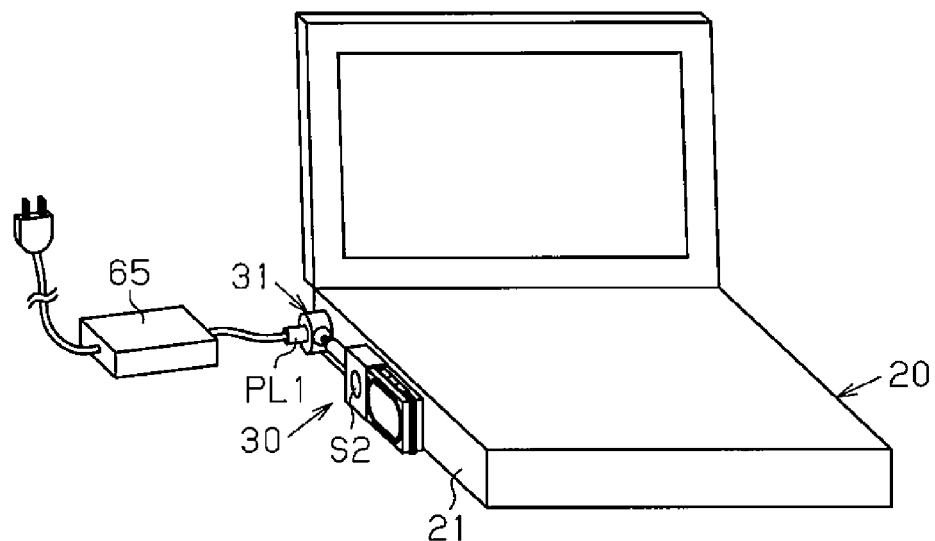
FIGS. 21A and 21B are perspective views of a contactless adapter in a seventh modified example.
Figure 21B:
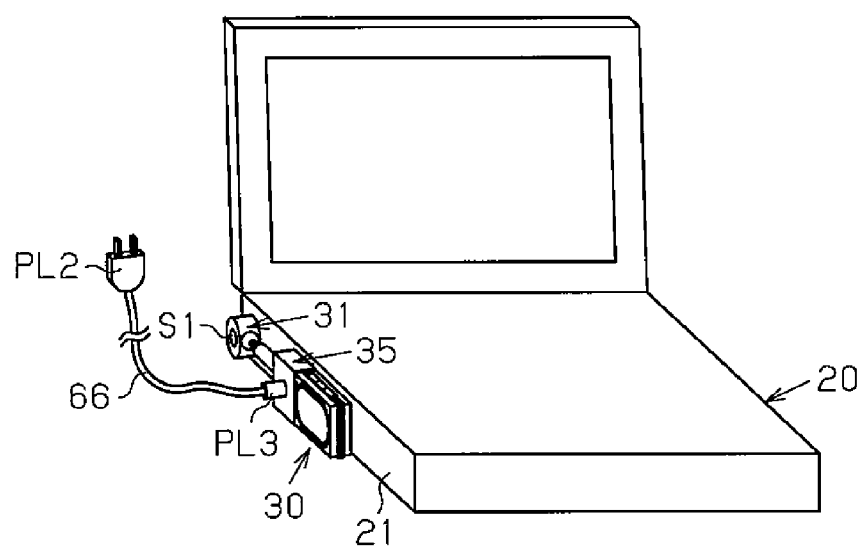

In the first embodiment, the contactless adapter 30 receives power from the power supplying device 10 and supplies the power to the notebook computer 20 in a contactless manner. As shown in FIGS. 21A and 21B, a first plug outlet S1 is provided in the housing 31*a* of the plug unit 31, and a second plug outlet S2 is provided in the housing 35*a* of the power supply circuit unit 35.

As shown in FIG. 21A, a plug PL1 of an AC adapter 65 that rectifies AC voltage of the commercial AC power supply 50 and converts the AC voltage to DC voltage of a predetermined value is inserted to the first plug outlet S1 to electrically connect a terminal of the plug PL1 of the AC adapter 65 to the output terminal 33 of the plug unit 31. This supplies DC voltage from the AC adapter 65 to the notebook computer 20.

A cord 66 shown in FIG. 21B has a household plug P2 inserted to a home socket on one end and an output side plug PL3 inserted to the second plug outlet S2 on the other end. The household plug PL2 is inserted to the home socket, and the output side plug PL3 is inserted to the second plug outlet S2.

This electrically connects the terminal of the output side plug PL3 to between the input terminals of the full-wave rectifying circuit 37*a* of the power supply circuit unit 35. At this time, the series circuit of the secondary coil 41 and the resonance capacitor 36*a* is insulated from the full-wave rectifying circuit 37*a*.

Therefore, the AC voltage of the commercial AC power supply 50 is rectified by the full-wave rectifying circuit 37*a* and converted to the DC voltage, and then supplied to the notebook computer 20 via the constant voltage stabilizing circuit 38.

The AC voltage of the AC power supply 50 is directly rectified by the full-wave rectifying circuit 37*a* of the power supply circuit unit 35. However, a dedicated rectifying circuit for rectifying the AC voltage may be arranged on the power supply circuit unit 35.

Thus, the contactless adapter 30 is applicable to various power supplies, and the notebook computer 20 to which the contactless adapter 30 is attached has more options for the power that can be obtained. In addition, portability is further improved. The plug PL1 and the plug PL3 serve as input terminals.

The contactless adapter 30 shown in FIGS. 21A and 21B includes the first and second plug outlets S1, S2, but may include only either one of them.

Figure 22A:
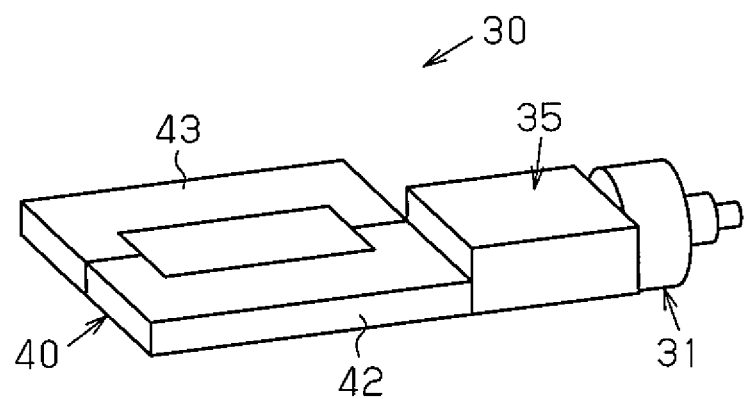
FIGS. 22A and 22B are perspective views of a contactless adapter in an eighth modified example.
Figure 22B:
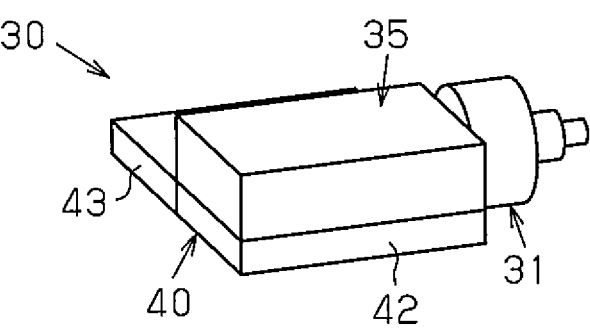

In the first embodiment, the telescopic arm 34 is arranged between the plug unit 31 and the power supply circuit unit 35. The telescopic arm 34 may be omitted, and the plug unit 31 and the power supply circuit unit 35 may be directly coupled, as shown in FIGS. 22A and 22B. The power receiving unit 40 shown in FIG. 22B has the entire non-power receiving surface of the fixed substrate 42 securely attached to a wide outer side surface of the housing 35*a* of the power supply circuit unit 35. The pivot substrate 43 is coupled to the fixed substrate 42 by the hinge 44.

Figure 23:
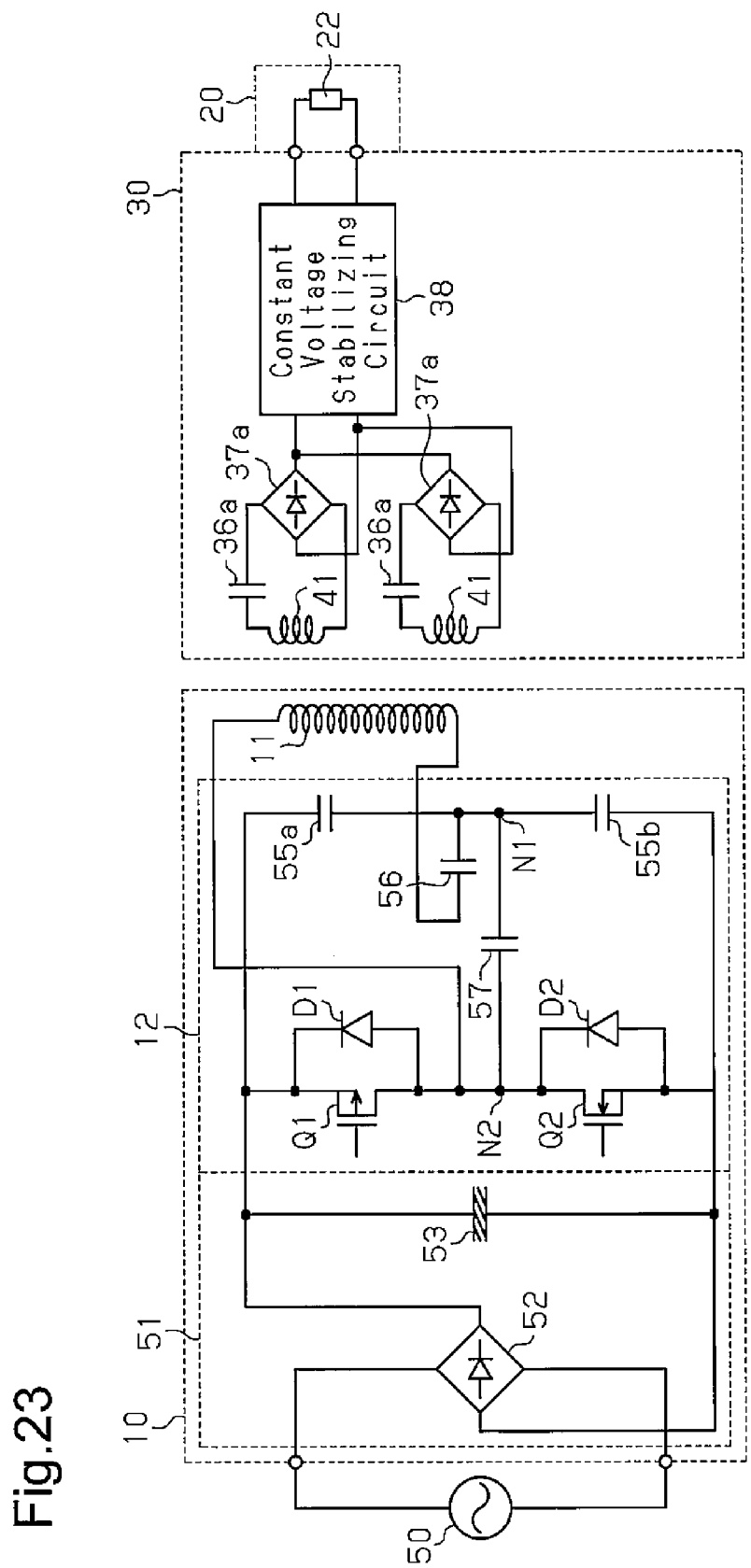
FIG. 23 is an electrical circuit diagram of a contactless adapter in a ninth modified example.

In the first embodiment, the secondary coil 41 arranged in the fixed substrate 42 and the secondary coil 41 arranged in the pivot substrate 43 are connected in series, and one resonance capacitor 36*a* is connected in series to the series circuit. The series circuit including the two secondary coils 41 and one resonance capacitor 36*a* is connected to one full-wave rectifying circuit 37*a*, and the induced electromotive forces generated from the two secondary coils 41 are input to the full-wave rectifying circuit 37*a*. As shown in FIG. 23, the resonance capacitor 36a and the full-wave rectifying circuit 37a may be provided for each secondary coil 41.

For example, the resonance capacitor 36a is connected in series to each secondary coil 41. The series circuit including one secondary coil 41 and one resonance capacitor 36a is connected to each full-wave rectifying circuit 37a. The induced electromotive force generated from the corresponding one secondary coil 41 is input to each full-wave rectifying circuit 37a. Each full-wave rectifying circuit 37a outputs the DC voltage obtained by rectifying the induced electromotive force generated by the respective secondary coil 41 to one constant voltage stabilizing circuit 38.

In the contactless adapter 30 shown in FIGS. 16 to 19, a plurality of pivot substrates 43 are used for the secondary coil 41 of the fixed substrate 42, and the secondary coil 41 is arranged in each of the pivot substrates 43. In this case as well, the resonance capacitor 36a and the full-wave rectifying circuit 37a may be provided for each of the secondary coils 41.

In the contactless adapter 30 shown in FIGS. 16 to 19, the secondary coils 41 may be connected in series, and one resonance capacitor 36a and one full-wave rectifying circuit 37a may be provided for the series circuit like in the first embodiment.

In the first embodiment, the contactless adapter 30 is directly attached in a removable manner to the main body side surface 21 of the notebook computer 20. If the contactless adapter 30 is accommodated in a dedicated case like a tablet PC, which serves as an electrical appliance, the contactless adapter 30 may be attached in a removable manner to the main body side surface of the tablet PC through the dedicated case.

Figure 24A:
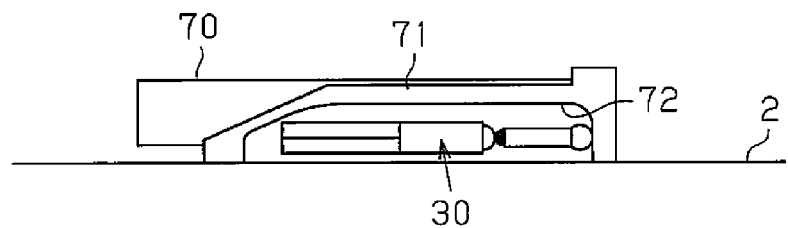
FIGS. 24A, 24B, and 24C are side views of a contactless adapter in a tenth modified example.
Figure 24B:
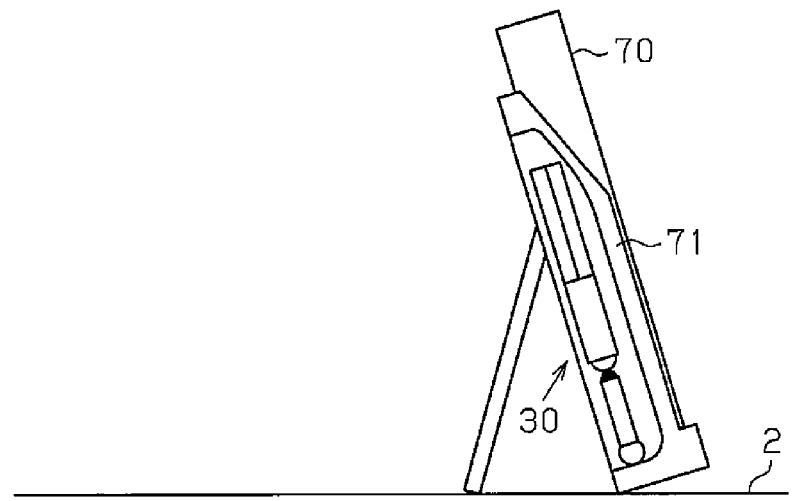
Figure 24C:
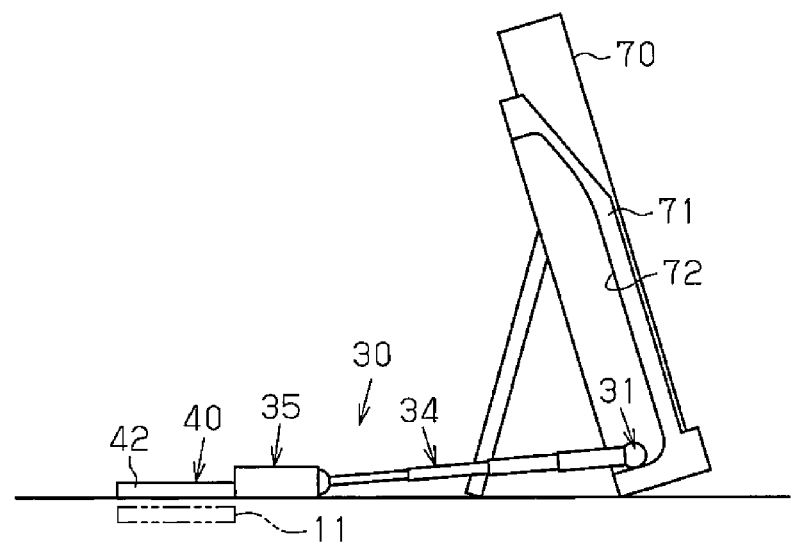

For example, as shown in FIGS. 24A to 24C, a tablet PC 70 is accommodated in a case 71. An accommodation recess 72 having a size allowing the contactless adapter 30 to be connected is cut out from the case 71 at a side surface facing the side surface where the plug socket (outlet) of the tablet PC 70 is formed. A through-hole (not shown) extends through the inner side surface of the accommodation recess 72 at a position facing the plug socket of the tablet PC 70.

A long shaft portion 32 formed in the plug unit 31 of the contactless adapter 30 is inserted to the through-hole, and attached to the plug socket of the tablet PC 70. This arranges the contactless adapter 30 in the accommodation recess 72 formed in the side surface of the case 71, as shown in FIG. 24A.

Therefore, when not in use, the contactless adapter 30 is integrated with the case 71 and is not an obstacle when carried. Furthermore, even if the tablet PC 70 is held upright as shown in FIG. 24B, the contactless adapter 30 is held in the accommodation recess 72 and is not an obstacle.

When placing the tablet PC 70 upright and using the tablet PC 70 while receiving power, as shown in FIG. 24C, the telescopic arm 34 is extended so that the secondary coil 41 of the power receiving unit 40 faces the primary coil 11 of the power supplying device 10. The tablet PC 70 can thus be used while receiving power from the power supplying device 10.

In the first embodiment, the resonance circuit 36 including the resonance capacitor 36a is arranged in the power supply circuit unit 35. However, the resonance circuit 36 may be omitted when the voltage at the power supplying device 10 is high or when the voltage output to the load 22 is small.

In the first embodiment, the resonance circuit 36, the rectifying circuit 37, and the constant voltage stabilizing circuit 38 are arranged in the housing 35a of the power supply circuit unit 35. However, such circuits may be incorporated in the housing 31a of the plug unit 31. In this case, the housing 35a of the power supply circuit unit 35 functions as a supporting structure of the power receiving unit 40.

The display lamp LP may be arranged on either one of the housing 31a of the plug unit 31 or the housing 35a of the power supply circuit unit 35.

In the first embodiment, the power supplying device 10 (primary coil 11) is arranged at three areas, left, right, and central positions, toward the rear of the desktop of the desk 1. The contactless adapter 30 is arranged such that the secondary coil 41 faces one primary coil 11 to receive power from the power supplying device 10. For example, a plurality of primary coils 11 may be arranged in an array extending in a lateral direction at the rear side of the desktop 2 of the desk 1, and the secondary coil 41 of the contactless adapter 30 may face and extend across the plurality of primary coils 11. In this case, the contactless adapter 30 can receive greater power from the power supplying device 10 of the plurality of primary coils 11 through the secondary coil 41.

A second embodiment of the contactless power supply system will now be described. The feature of the second embodiment is in the power receiving unit 40 of the contactless adapter 30. The feature will be described in detail, and parts that are the same as the first embodiment will not be described.

Figure 25:
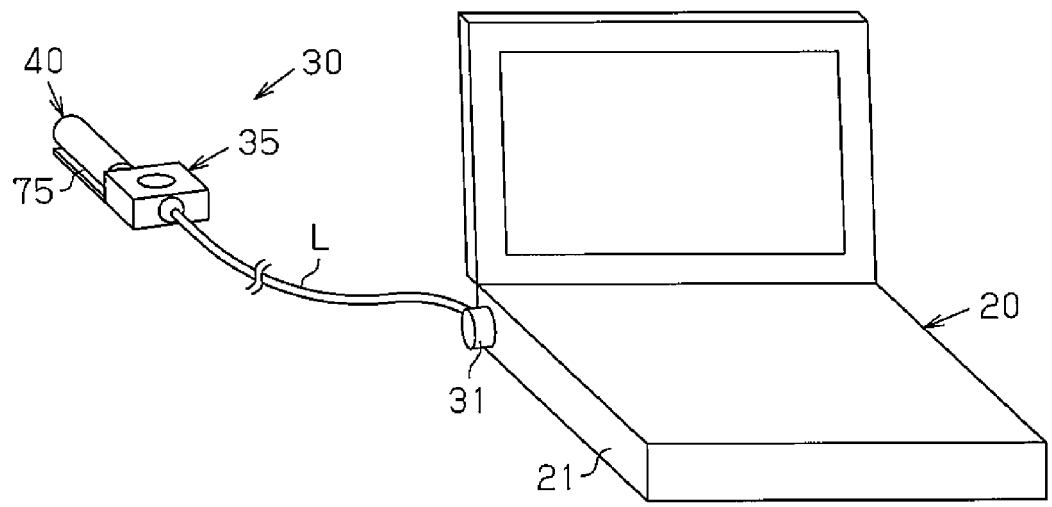
FIG. 25 is a perspective view of a contactless adapter and a notebook computer in a second embodiment of a contactless power supply system.
Figure 26:
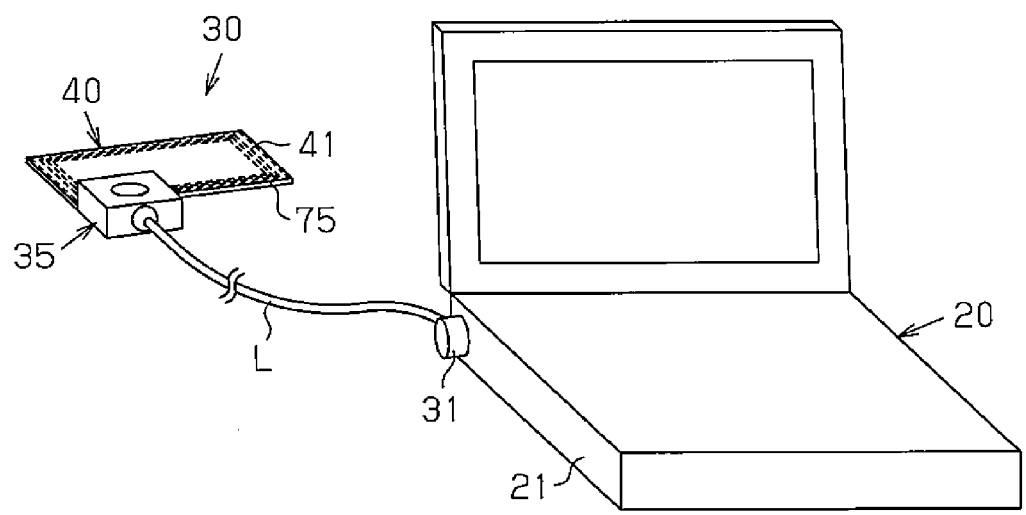
FIG. 26 is a perspective view of the contactless adapter and the notebook computer shown in FIG. 25 when the power receiving unit is in the spread state.

As shown in FIGS. 25 and 26, the power receiving unit 40 arranged on the other side surface of the housing 35a of the power supply circuit unit 35 includes a film substrate 75 serving as a flexible substrate. The film substrate 75 is a film made of synthetic resin and changes shapes between a planar form when spread as shown in FIG. 27A and a cylindrical form when rolled as shown in FIG. 27B.

The film substrate 75 has a rectangular shape in the spread state. One long side is coupled to a side surface of the housing 35a of the power supply circuit unit 35. The film substrate 75 is coupled so that when the film substrate 75 is spread in the planar form, one side surface (power receiving surface 75a) of the film substrate 75 is flush with the side surface of the housing 35a of the power supply circuit unit 35.

When the film substrate 75 is spread in the planar form, the length in the spread direction is set to be the same as the fixed substrate 42 and the pivot substrate 43 spread out in the first embodiment. Furthermore, when the film substrate 75 is spread in the planar form, the length in the direction orthogonal to the spread direction coincides with the length of the fixed substrate 42 and the pivot substrate 43 in the first embodiment.

Figure 27A:
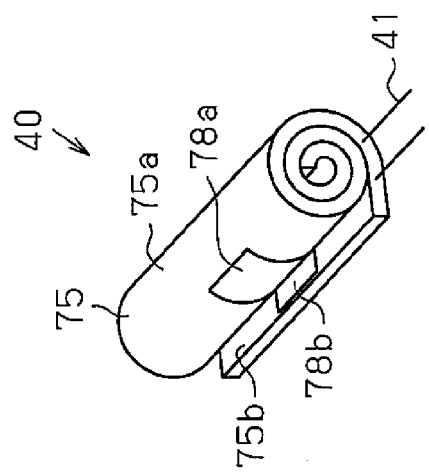
FIGS. 27A and 27B are perspective views of the power receiving unit.
Figure 27B:
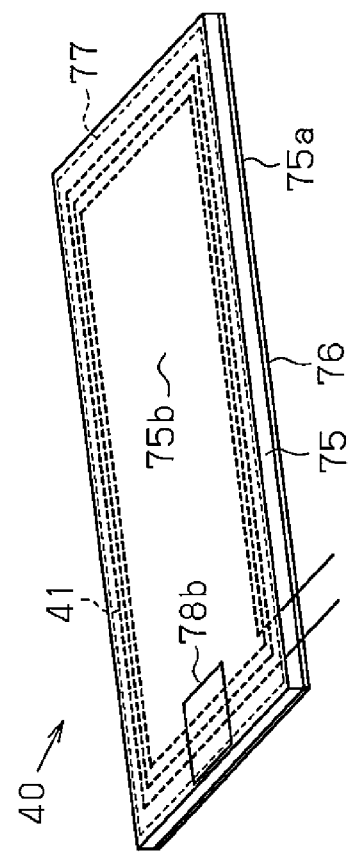

As shown in FIG. 27A, an electromagnetic shield seal 76 such as aluminum foil or the like is formed on a power receiving surface 75a of the film substrate 75, and a magnetic body film 77 including an amorphous thin film or the like is formed on the electromagnetic shield seal 76. The secondary coil 41 in which a copper wire is configured by a print pattern is formed on the surface of the magnetic body film 77. The electromagnetic shield seal 76, the magnetic body film 77, and the secondary coil 41 can change shapes with the film substrate 75 to a planar form when spread or a cylindrical form when rolled. The changing of shapes does not cause breakage, disconnection, or the like.

The electromagnetic shield seal 76, the magnetic body film 77, and the secondary coil 41 formed on the power receiving surface 75a of the film substrate 75 are covered with an insulating protective film (not shown) made of synthetic resin.

The film substrate 75 is normally in the spread state, and is rolled to a cylindrical form. When released from the state rolled into the cylindrical form, the film substrate 75 is automatically spread due to its resiliency. Therefore, in order to hold the film substrate 75 rolled into the cylindrical form, the film substrate 75 includes hook-and-loop fasteners 78a, 78b respectively arranged at predetermined positions shown in FIGS. 27A and 27B of the power receiving surface 75a and a non-power receiving surface 75b.

Therefore, by combining the hook-and-loop fasteners 78a, 78b with the film substrate 75 rolled to the cylindrical form, the film substrate 75 is held rolled into the cylindrical form without being spread by its resiliency due the coupling force of the hook-and-loop fasteners 78a, 78b.

The force coupling the hook-and-loop fasteners 78a, 78b is eliminated by pulling the hook-and-loop fasteners 78a, 78b away from each other. This allows the film substrate 75 to be easily spread by its resiliency.

One secondary coil 41 is formed in the power receiving surface 75a of the film substrate 75 on the electromagnetic shield seal 76 and the magnetic body film 77. This differs from the first embodiment in which the secondary coil 41 is formed on each of the fixed substrate 42 and the pivot substrate 43. The coil shape of the secondary coil 41 formed on the film substrate 75 is rectangular in shape like the film substrate 75 in the spread state, and the coil area becomes greater than the total coil area of the secondary coils 41 of the fixed substrate 42 and the pivot substrate 43 in the first embodiment.

Figure 28:
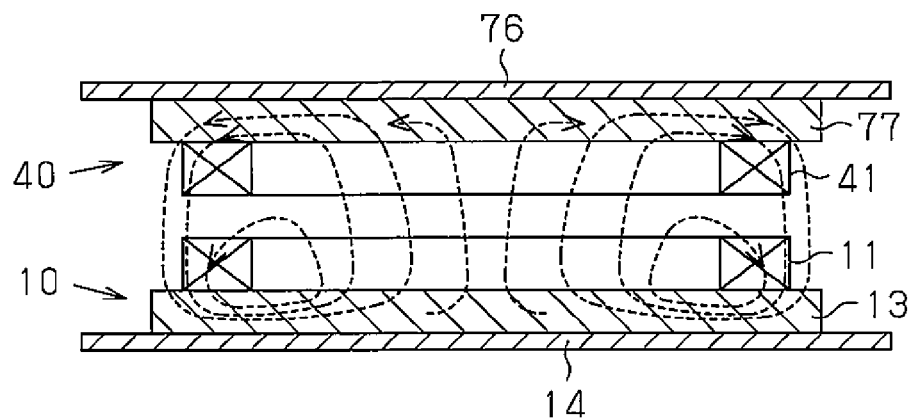
FIG. 28 is a schematic cross-sectional view of the magnetically coupled power supplying device and the contactless adapter.

Therefore, when the film substrate 75 is in the spread state, the center position of the film substrate 75 is positioned on the marker 3 indicated on the desktop 2. The primary coil 11 and the secondary coil 41 are thus in a magnetically coupled state in which the magnetic flux of the primary coil 11 interlinks with the secondary coil 41 as shown in the schematic diagram of FIG. 28.

The secondary coil 41 of the film substrate 75 interlinks with the alternating magnetic field generated by the primary coil 11, through which high frequency current flows, to generate the induced electromotive force.

The telescopic arm 34 is omitted from between the housing 35a of the power supply circuit unit 35, to which the film substrate 75 is attached, and the housing 31a of the plug unit 31. Therefore, the insulation coated connection line L connecting the power supply circuit unit 35 (constant voltage stabilizing circuit 38) and the plug unit 31 (output terminal 33) is reeled by the cord reel in the housing 31a of the plug unit 31. That is, when not in use, the connection line L is reeled into the housing 31a of the plug unit 31 by the cord reel, and the power supply circuit unit 35 and the plug unit 31 are coupled in contact with each other.

When the power supply circuit unit 35 is pulled away from the plug unit 31, the insulation coated connection line L is reeled out of the housing 31a of the plug unit 31 by the cord reeling/re-reeling mechanism, and the power supply circuit unit 35 and the power receiving unit 40 are arranged at the desired positions. In this case, when the connection line L is no longer pulled, the cord reel remains in the same state and does not reel in the connection line L even if tension is released. Therefore, the power receiving unit 40 can face the primary coil 11 at the position spaced apart from the notebook computer 20, and power can be supplied from the power supplying device 10.

When stopping the supply of power, tension is applied to the connection line L and then immediately released so that the connection line L is reeled in by the cord reel. This reels the connection line L into the housing 31a of the plug unit 31, and the power supply circuit unit 35 and the plug unit 31 are held in contact with each other. When not in use, the contactless adapter 30 is held along the main body side surface 21 of the notebook computer 20. Thus, the notebook computer 20 has superior portability like in the first embodiment.

Figure 29:
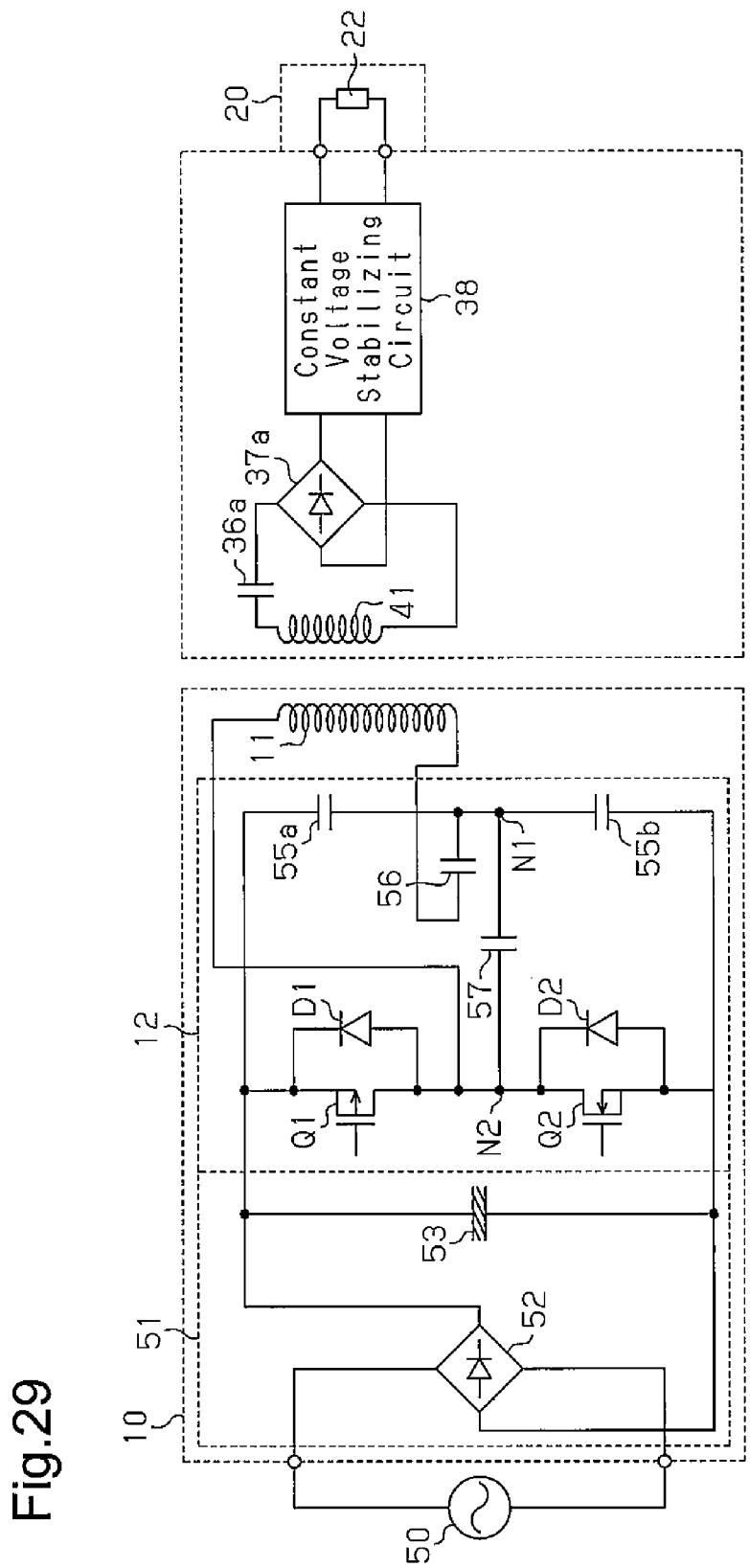
FIG. 29 is an electrical circuit diagram of the contactless power supply system in the second embodiment.

The electrical configuration of the contactless power supply system differs from the first embodiment in that the contactless adapter 30 includes only one secondary coil 41, as shown in the electrical circuit of FIG. 29. In other words, one resonance capacitor 36a is connected in series to one secondary coil 41.

The operation of the contactless adapter 30 will now be described.

When the contactless adapter 30 is not in use, the plug unit 31 of the contactless adapter 30 is attached to the main body side surface 21 of the notebook computer 20. In this case, the contactless adapter 30 is arranged so that the housing 31a of the plug unit 31, the housing 35a of the power supply circuit unit 35, and the film substrate 75 (power receiving unit 40), which is rolled into a cylindrical form, are laid out along the main body side surface 21 of the notebook computer 20.

In the same manner as the first embodiment, the housing 35a of the power supply circuit unit 35 and the power receiving unit 40 (film substrate 75 rolled to a cylindrical form) are drawn out from the plug unit 31 to an approximate position where the marker 3 is indicated. After pulling out the housing 35a of the power supply circuit unit 35 and the power receiving unit 40 to the approximate position, the hook-and-loop fasteners 78a, 78b are pulled apart to spread out the film substrate 75 from the state rolled into the cylindrical form.

In this state, the center position of the spread film substrate 75 is aligned with the marker 3 indicated on the desktop 2, as shown in FIG. 26. In this case, the alignment is performed in the same manner as the first embodiment.

Thus, the secondary coil 41 of the film substrate 75 of the power receiving unit 40 interlinks with the alternating magnetic field generated from the primary coil 11 of the power supplying device 10 to generate induced electromotive force, which is output to the power supply circuit unit 35. The power supply circuit unit 35 converts the induced electromotive force to a predetermined DC voltage, which is sent from the output terminal 33 of the plug unit 31 to the notebook computer 20 as a drive power through the connection line L reeled out from the housing 31a of the plug unit 31.

When stopping the supply of power with the contactless adapter 30, the spread film substrate 75 is rolled into a cylindrical form and the film substrate 75 is held rolled into the cylindrical form by attaching the hook-and-loop fasteners 78a, 78b. When the tension is applied to the connection line L and immediately released, the connection line L is reeled in by the cord reeling/re-reeling mechanism. The power supply circuit unit 35 and the plug unit 31 are held in contact with each other.

Then, the housing 31a of the plug unit 31, the housing 35a of the power supply circuit unit 35, and the film substrate 75 (power receiving unit 40) rolled to a cylindrical form, which are parts of the contactless adapter 30, are arranged along the main body side surface 21 of the notebook computer 20. The plug unit 31 is attached to the main body side surface 21 of the notebook computer 20 until the contactless adapter 30 is used the next time power is supplied.

The second embodiment has the following advantages.

(1) In the second embodiment, the notebook computer 20 receives power from the power supplying device 10 via the contactless adapter 30 attached to the notebook computer 20 even if the notebook computer 20 is spaced apart from the power supplying device 10. This improves the degree of freedom for the position where the notebook computer 20 can be placed on the desk 1.

(2) In the second embodiment, the power receiving unit 40 includes the secondary coil 41 formed on the film substrate 75. The film substrate 75 is configured to be rollable into the cylindrical form so that the film substrate 75 can be in rolled or spread. In the rolled state, the hook-and-loop fasteners 78a, 78b are attached so that the film substrate 75 is held in the rolled state. The film substrate 75 is spread to a planar form by its resiliency by pulling apart the attached hook-and-loop fasteners 78a, 78b.

Therefore, the secondary coil 41 formed on the film substrate 75 increases the area of the coil surface formed on the film substrate 75 having a wide area in the spread state, and obtains the induced electromotive force of high output from the alternating magnetic field of the primary coil 11 of the power supplying device 10.

(3) In the second embodiment, the film substrate 75 is rolled to be held in the cylindrical form, and the overall size of the film substrate 75 is compact when not used.

(4) In the second embodiment, the contactless adapter 30 is attached to the main body side surface 21 of the notebook computer 20. The power receiving unit 40 including the housing 31a of the plug unit 31 of the contactless adapter 30, the housing 35a of the power supply circuit unit 35, and the film substrate 75 rolled into the cylindrical form are arranged along the main body side surface 21 of the notebook computer 20. Therefore, the contactless adapter 30 is compact when attached to the notebook computer 20. This allows the notebook computer 20 to be carried together with the contactless adapter 30 without the portability being adversely affected.

(5) In the second embodiment, the magnetic body film 77 is formed on the power receiving surface 75a of the film substrate 75, and the secondary coil 41 is formed on the surface of the magnetic body film 77. This reduces the magnetic flux that leaks to open space. Furthermore, since the electromagnetic shield seal 76 is formed between the film substrate 75 and the magnetic body film 77, the electromagnetic wave radiated to the outer side is blocked.

In the second embodiment, the housing 35a of the power supply circuit unit 35 and the housing 31a of the plug unit 31 are coupled to the connection line L that can be reeled in and reeled out but may be coupled to the telescopic arm 34 like in the first embodiment.

In the same manner as the first embodiment, the display lamp LP that indicates the magnetic coupling of the secondary coil 41 to the primary coil 11 may be arranged on the housing 35a of the power supply circuit unit 35 so that the magnetic coupling is easy to visually recognize from the illumination of the display lamp LP.

A third embodiment of the contactless power supply system will now be described. The feature of the third embodiment is in the power supplying device 10 of the contactless power supply system.

Figure 30:
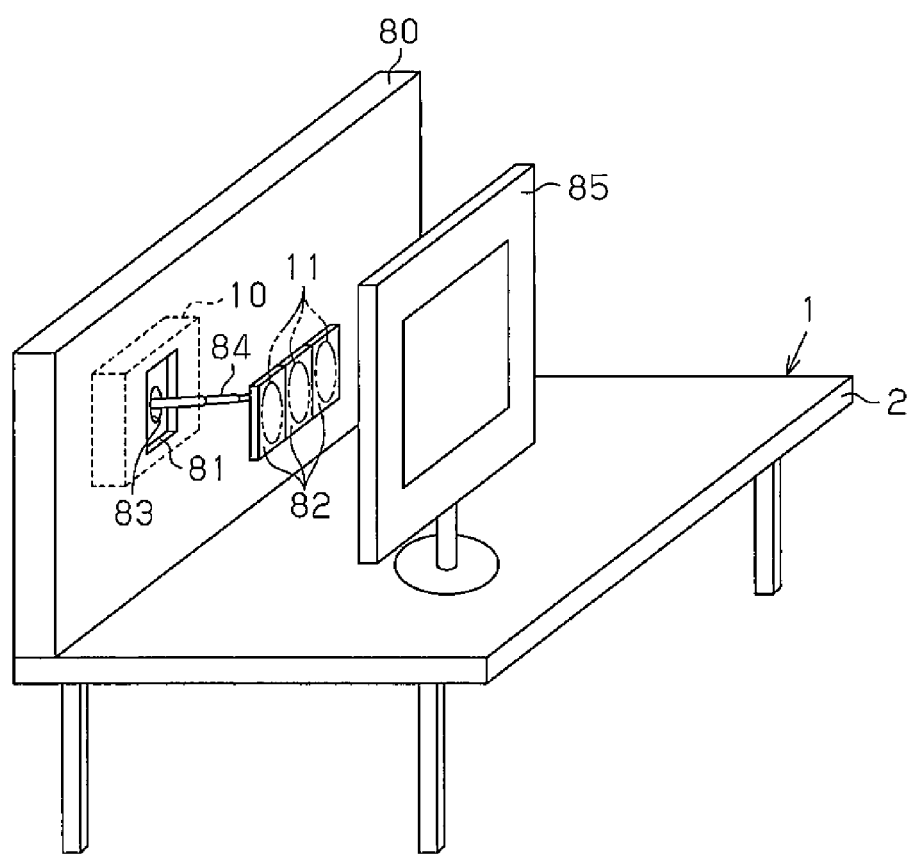
FIG. 30 is a perspective view of a third embodiment of a contactless power supply system.

As shown in FIG. 30, a sideboard 80 is fixed upright at the rear of the desktop 2 of the desk 1. The sideboard 80 may configure part of the desk 1 or may be separate from the desk 1. The power supplying device 10 is arranged in the sideboard 80. The power supplying device 10 may include a housing accommodating the power supply circuit 51 and the high frequency inverter 12.

An accommodation recess 81 is formed on the front surface of the sideboard 80 where the housing of the power supplying device 10 is accommodated. The accommodation recess 81 accommodates three coil formation substrates 82, each including the primary coil 11 (not shown in FIG. 30), in an overlapped state. The primary coils 11 formed on the three coil formation substrates 82 are connected in series.

The three coil formation substrates 82 include a middle coil formation substrate 82, and two coil formation substrates 82 coupled, in a foldable manner, to two sides of the middle coil formation substrate 82 by hinges (not shown). The coil formation substrates 82 on the two sides are folded to overlap the middle coil formation substrate 82 so that the three coil formation substrates 82 are overlapped in three layers.

An accommodation compartment 83 is formed at the middle of the accommodation recess 81. A telescopic arm 84 is arranged in the accommodation compartment 83. The telescopic arm 84 has a configuration similar to the telescopic arm 34 of the first embodiment and includes a plurality of pipes having an extensible structure. The telescopic arm 84 (pipe) may be projected from the sideboard 80.

The distal end of the telescopic arm 84 is coupled to the middle coil formation substrate 82, for example, by a universal joint (not shown). The basal end of the telescopic arm 84 is coupled to the accommodation compartment 83 by a universal joint (not shown). An insulation coated connection line (not shown) is wired in the telescopic arm 84. The connection line supplies the high frequency current generated by the high frequency inverter 12 to the primary coils 11, which are connected in series.

The sliding resistance between the plurality of pipes configuring the telescopic arm 84 and the universal joint is set in the same manner as the first embodiment. Therefore, when drawn out to the desired position, the coil formation substrates 82 are maintained in the same state unless force is applied.

Preferably, the connection line wired in the telescopic arm 84 is reeled out and in in accordance with the extension and contraction of the telescopic arm 84 by a reel arranged in the housing of the power supplying device 10 in the same manner as the first embodiment.

Preferably, the coil formation substrate 82 is a plate having an electromagnetic shield property like the substrates 42, 43 of the first embodiment. A magnetic body (not shown) is arranged on the coil formation substrate 82, and the primary coil 11 is formed on the magnetic body.

The operation of the power supplying device 10 will now be described.

When the power supplying device 10 is not used, the telescopic arm 84 is contracted and arranged in the accommodation compartment 83, and the coil formation substrates 82 are folded into three layers and fitted into the accommodation recess 81 of the sideboard 80.

When using the power supplying device 10, the folded coil formation substrates 82 are drawn out from the accommodation recess 81 to near a television 85 serving as an electrical appliance. In this case, the telescopic arm 84 is also extended. The coil formation substrates 82 that are folded into three layers are spread as shown in FIG. 30. The spread primary coil 11 is aligned to face the secondary coil (not shown) incorporated in the television 85. Thus, the secondary coil of the television 85 receives power through the primary coil 11 of the power supplying device 10.

When stopping the supply of power from the power supplying device 10, the spread coil formation substrates 82 are folded into three layers. The telescopic arm 84 is contracted and arranged inside the accommodation compartment 83. The coil formation substrates 82, which are folded into three layers, are fitted into the accommodation recess 81 of the sideboard 80.

The power supplying device 10 of FIG. 30 supplies power to the television 85 including the secondary coil for contactless power supply but can also supply power to the notebook computer 20 attached with the contactless adapter 30 of the first embodiment. For example, the power supply can be performed by aligning the spread coil formation substrates 82 with the fixed substrate 42 and the pivot substrate 43 of the power receiving unit 40 of the contactless adapter 30.

The third embodiment has the advantages described below.

(1) In the third embodiment, the primary coils 11 (coil formation substrates 82) of the power supplying device 10 are arranged at a desired position within a range in which the telescopic arm 84 is extendable. Thus, the television 85 is supplied with power from the power supplying device 10 even when spaced apart from the sideboard 80 (power supplying device 10). This improves the degree of freedom in the position of the television 85 on the desk 1.

Furthermore, in the notebook computer 20 to which the contactless adapter 30 shown in the first embodiment is attached, the degree of freedom in the position of the notebook on the desk 1 is further improved.

Each embodiment may be modified as below.

In each embodiment, the contactless adapter 30 may have a measuring function for detecting the optimum magnetically coupled state of the primary coil 11 and the secondary coil 41 and indicating the magnetically coupled state with the display lamp LP. The measuring function may be provided for the notebook computer 20 (electrical appliance) or the power supplying device 10. In an example in which the notebook computer 20 has the measuring function, the magnetically coupled state is detected based on the output voltage of the output terminal 33 and the detection result is indicated by the display lamp LP arranged on the notebook computer 20.

In the example in which the power supplying device 10 has the measuring function, the magnetically coupled state is detected (e.g., primary current I1 is detected) based on an impedance as viewed from the primary coil 11, and the detection result is indicated by the display lamp arranged on the desktop 2 adjacent to the primary coil 11.

In each embodiment, the magnetically coupled state is visually notified by the display lamp LP but may be audibly notified by a buzzer.

In each embodiment, the contactless adapter 30 has the output terminal 33 of the plug unit 31 electrically connected to the input terminal of the notebook computer 20 to supply the DC voltage to the notebook computer 20. In another example, the DC voltage output from the constant voltage stabilizing circuit 38 is converted to alternating current by the DCAC conversion circuit in the power supply circuit unit 35 of the contactless adapter 30. The alternating current excites the power supplying coil arranged on the connection line L. The power supplying coil and the secondary coil incorporated in the electrical appliance are magnetically coupled so that the alternating magnetic field generated from the excited power supplying coil interlinks with the secondary coil thus causing the secondary coil of the electrical appliance to generate the induced electromotive force.

The coil formation substrates 82 of the third embodiment are not limited to three and may be configured to be one, two, or four or more. If the coil formation substrate 82 is one or two, preferably, each coil formation substrate 82 is enlarged.

The desk 1 serves as an object having a setting surface on which the electrical appliance can be placed. The sideboard 80 serves as an object arranged on a setting surface, on which the electrical appliance can be placed, or including the installing surface. The power supplying device 10 may be arranged on an object other than the desk 1 and the sideboard 80 as long as the object includes a setting surface or the object is arranged on the installing surface.

The embodiments and modifications may be combined.

The invention claimed is:

1. A contactless power supply system comprising:
a power supplying device including a high frequency inverter, which is connected to a power supply and which generates a high frequency current, and a primary coil, which is connected to the high frequency inverter and which is supplied with the high frequency current;
a contactless adapter including a secondary coil, which is arranged on a substrate and which generates an induced electromotive force with an alternating magnetic field generated by the primary coil of the power supplying device, a power supply circuit unit, which converts the induced electromotive force generated at the secondary coil to a predetermined output voltage, an output unit, which outputs the output voltage converted by the power supply circuit unit, and a connection line, which connects the power supply circuit unit and the output unit, wherein the substrate is a substrate that is rollable into and spreadable from a cylindrical form or a substrate that is foldable and spreadable; and
an electrical appliance electrically connected or magnetically coupled to the output unit of the contactless adapter to receive the output voltage of the contactless adapter;
wherein the contactless adapter is attached to the electrical appliance so that the contactless adapter can be carried integrally with the electrical appliance;
the output unit of the contactless adapter is configured to be attached in a removable manner to the electrical appliance;
when the output unit is attached to the electrical appliance, the contactless adapter is pivotally supported by the electrical appliance; and
the contactless adapter includes a coupling body that couples the output unit and the power supply circuit unit so that a distance and an angle of the output unit and the power supply circuit are changeable, and the connection line is wired along the coupling body.

2. The contactless power supply system according to claim 1, wherein
the electrical appliance includes an accommodation compartment formed to accommodate the contactless adapter; and
the contactless adapter is accommodated and held in the accommodation compartment when not in use and drawn out of the accommodation compartment when used.

3. The contactless power supply system according to claim 1, wherein the electrical appliance is accommodated in a dedicated case, and the contactless adapter is attached to the electrical appliance through the dedicated case.

4. The contactless power supply system according to claim 1, wherein any one of the power supplying device, the contactless adapter, and the electrical appliance includes a display function for detecting and displaying a magnetic coupling state of the primary coil and the secondary coil.

5. The contactless power supply system according to claim 1, wherein the power supplying device is one of a plurality of power supplying devices, and the primary coils of the plurality of power supplying devices are arranged in an array so that the secondary coil of the contactless adapter when spread faces and extends across the plurality of primary coils.

6. A contactless adapter comprising:
   a secondary coil that is arranged on a substrate and generates an induced electromotive force;
   a power supply circuit unit that converts the induced electromotive force generated at the secondary coil to a predetermined output voltage;
   an output unit configured to be able to be electrically connected or magnetically coupled to an electrical appliance to supply the output voltage converted by the power supply circuit unit to the electrical appliance;
   a connection line that connects the power supply circuit unit and the output unit;
   a housing that incorporates the power supply circuit unit, wherein a portion of the substrate is coupled to the housing; and
   a coupling body that couples the housing of the power supply circuit unit and the output unit so that a distance and an angle are variable, wherein the connection line is arranged along the coupling body;
   wherein the substrate is a substrate that is rollable into and spreadable from a cylindrical form or a substrate that is foldable and spreadable;
   the contactless adapter is attached to the electrical appliance so that the contactless adapter can be carried integrally with the electrical appliance;
   the output unit of the contactless adapter is configured to be attached in a removable manner to the electrical appliance; and
   when the output unit is attached to the electrical appliance, the contactless adapter is pivotally supported by the electrical appliance.

7. The contactless adapter according to claim 6, wherein the substrate is configured by a plurality of substrate segments coupled in a foldable manner, and the secondary coil is arranged on each substrate segment.

8. The contactless adapter according to claim 7, wherein each substrate segment includes a magnetic body and an electromagnetic shield plate, the secondary coil is arranged on one side surface of the magnetic body, and the electromagnetic shield plate is arranged on another side surface of the magnetic body.

9. The contactless adapter according to claim 6, wherein the substrate that is rollable into and spreadable from a cylindrical form a single flexible substrate including the secondary coil.

10. The contactless adapter according to claim 9, wherein the flexible substrate includes a magnetic thin film and an electromagnetic shield thin film formed on the magnetic thin film, and the secondary coil is formed on the magnetic thin film at a side opposite to a surface on which the electromagnetic shield thin film is formed.

11. The contactless adapter according to claim 6, wherein
   the housing of the power supply circuit unit includes an input terminal connected to a commercial AC power supply; and
   the power supply circuit unit converts input voltage supplied to the input terminal to a predetermined output voltage and supplies the output voltage to the electrical appliance via the output unit.

12. The contactless adapter according to claim 6, wherein the output unit includes an input terminal connected to an output terminal of an AC adapter that AC-DC-converts commercial AC power and supplies the electrical appliance with DC power supply input to the input terminal.

13. The contactless adapter according to claim 6, wherein the contactless adapter includes a display function for detecting and displaying a magnetic coupling state of the secondary coil and a primary coil.

14. A power supplying device accommodated in an object including an accommodation recess, the power supplying device comprising:
   a high frequency inverter that is connected to a power supply and generates a high frequency current;
   a primary coil that is connected to the high frequency inverter and generates an alternating magnetic field to generate an induced electromotive force at a secondary coil when supplied with the high frequency current;
   a coil formation substrate including the primary coil;
   a coupling body that couples the accommodation recess of the object and the coil formation substrate so that a distance and an angle are variable, wherein when the coil formation substrate is drawn to a desired position, the coupling body holds the coil formation substrate at that position as long as force is not applied; and
   a connection line that is wired along the coupling body and that connects the high frequency inverter and the primary coil, wherein
   the coil formation substrate is configured by a plurality of coil formation substrate portions coupled in a foldable manner,
   the primary coil is arranged on each coil formation substrate portion,
   when the coil formation substrate portions are folded, the coil formation substrate is configured to be fitted into the accommodation recess of the object such that the coil formation substrate portions are accommodated in the accommodation recess in a folded state when the power supplying device is not used, and
   the coupling body is coupled to one of the coil formation substrate portions.

* * * * *